(12) United States Patent
Mayron

(10) Patent No.: US 6,738,472 B1
(45) Date of Patent: May 18, 2004

(54) SYSTEM AND METHOD FOR MANAGING TELEPHONY NETWORK RESOURCES

(75) Inventor: Yuval Mayron, Rishon Lezion (IL)

(73) Assignee: Sigvalue Technologies LTD, Hod Hasharon (IL)

( * ) Notice: Subject to any disclaimer, the term of this patent is extended or adjusted under 35 U.S.C. 154(b) by 803 days.

(21) Appl. No.: 09/655,930

(22) Filed: Sep. 6, 2000

(51) Int. Cl.[7] .............................................. H04M 7/00

(52) U.S. Cl. ........................................ 379/229; 379/230

(58) Field of Search .................... 379/221.09, 221.1, 379/221.12, 229, 230

(56) References Cited

U.S. PATENT DOCUMENTS 5,577,113 A  * 11/1996  Bray et al. ............. 379/220.01
6,343,124 B1 *  1/2002  Munoz ........................ 379/230

* cited by examiner

*Primary Examiner*—Ahmad Matar
*Assistant Examiner*—Quynh H. Nguyen
(74) *Attorney, Agent, or Firm*—Foley & Lardner

(57) ABSTRACT

Network architecture for establishing telephony connection, including a call management node, a first network node connected to the call management node via a first signaling link, and further connected to at least one first node telephony subscriber, a second network node connected to the call management node via a second signaling link, to the first network node via at least one voice link, and further connected to at least one second node telephony subscriber.

79 Claims, 11 Drawing Sheets

SYSTEM AND METHOD FOR MANAGING TELEPHONY NETWORK RESOURCES

FIELD OF THE INVENTION

The present invention relates to telephony communication in general, and to methods and systems for establishing and controlling telephone calls, in particular.

BACKGROUND OF THE INVENTION

Reference is now made to FIG. 1, which is a schematic illustration of a system for placing a call between a pre-paid mobile subscriber, and a land subscriber, which is known in the art. The system is includes a mobile switching center (MSC) 4, a central office (CO) 10 and a pre-paid system (PPS) 14. Pre-paid system 14 is also know as adjunct switch or service node. Mobile switching center (MSC) 4 is a gateway for a plurality of mobile subscribers (such as mobile subscriber 2) to a wide area telephony network. Central office (CO) 10 is a gateway for a plurality of land subscribers (such as land subscriber 8) to that wide area telephony network. Pre-paid system (PPS) 14 is operative to authorize and control telephony calls from mobile subscriber 2 to another subscriber such as a land subscriber 8 or other mobile subscribers. Mobile switching center (MSC) 4 is coupled to central office (CO) 10 and to pre-paid system (PPS) 14 via respective signaling links 36 and 34. It is noted that signaling links 34 and 36 are typically routed between the various network nodes by signal transfer point (STP) units (not shown), which serve as routers.

In the terminology of conventional telephony, a voice link between network nodes such as links 16, 22 and 28, represents a time slot in a multiplexed voice trunk. Each of the time slots is identified by a circuit identification code (CIC).

When mobile subscriber 2 initiates a telephone call to land subscriber 8, he first establishes a link 6 to MSC 4. It is noted that the type of link between a terminal and a respective network node, is typically different than a link between two network nodes.

MSC 4 initiates a call to PPS 14 via signaling link 34 and further directs the call thereto, via voice link 16, between ports 18 and 20. PPS 14 authorizes that call according to the account status of the mobile subscriber 2 and initiates a call back to MSC 4 via signaling link 34 and further directs that call thereto via voice link 22, between ports 24 and 26. MSC initiates a call to central office (CO) 10 via signaling link 36 and further directs the call received at port 26 to central office (CO) 10, via link 28, between ports 30 and 32. Central office (CO) 10 further directs the call to land subscriber 8 via a link 12.

PPS 14 constantly monitors the call established between mobile subscriber 2 and land subscriber 8, as it passes there through. It is noted that establishing such a telephone call requires allocating three ports in the MSC 4, two ports in the PPS 14 and one port in the CO 10. Each voice connection port 18, 26 and 30 employs a different circuit identification code and hence, MSC 4 has to assign three CICs for establishing that telephone call.

It will be appreciated by those skilled in the art that for the purpose of establishing a pre-paid call, MSC 4 has to initiate two calls, one from port 18 and another from port 30. The initiation and management of these calls, significantly load the processors of MSC 4. In addition, the capacity of MSC 4 is limited to a predetermined number of calls, which can be managed and switched thereby. Hence, every such pre-paid call, requires switch resources which could have been used for two regular calls. This significantly increases the cost of such a pre-paid call in terms of switching resource allocation.

Reference is now made to FIG. 2, which is a schematic illustration of a system for placing a call between a pre-paid mobile subscriber, and a land subscriber, which is known in the art. MSC 44, CO 50, and PPS 54 are analogous to MSC 4 (FIG. 1), CO 10, and PPS 14, respectively. MSC 44 is coupled to CO 50 and to PPS 54 via respective signaling links 40 and 56.

When mobile subscriber 42 initiates a telephone call to land subscriber 48, he first establishes a link 46 to MSC 44. MSC 44 initiates a call to PPS 54 via signaling link 56. PPS 54 authorizes that call according to the account status of the mobile subscriber 42 and initiates a return call, back to MSC 44 via signaling link 56. In that return call, PPS 54 directs MSC 44, to connect ports 60 and 62 via a voice link 64. The establishing of voice link 64 is known in the art as "loop-around".

In turn, MSC 44 initiates a call to CO 50 via signaling link 40. MSC 44, further directs the call, received at port 62, to CO 50, via voice link 58, between ports 66 and 68. CO 50 further directs the call to land subscriber 48.

PPS 54 constantly monitors the call established between mobile subscriber 42 and land subscriber 48, by communicating at a signaling level with MSC 44. It is noted that establishing such a telephone call requires allocating three ports in MSC 44, and a single port in CO 50.

Each voice connection port 60, 62 and 66 employs a different circuit identification code and hence, MSC 44 has to assign three CICs for establishing that telephone call. It will be appreciated by those skilled in the art that for the purpose of establishing that pre-paid call, MSC 44 has to initiate two calls, one from port 60 and another from port 66, which significantly load the processors thereof.

U.S. Pat. No. 5,708,702 to De Paul et al. entitled "Dynamic STP routing in response to triggering" is directed to a method for submitting queries to a remote database using SCCP/TCAP protocols. The method employs a common channel interoffice signaling (CCIS) network to determine a parameter respective of the called party (e.g., if the called party is busy), prior to construction of a telephone connection. When an originating end office receives a request to connect a caller to a called party, the originating end office sends a message to the terminating end office, via the CCIS network. The terminating end office determines if the called party is busy. If the called party is busy, then the terminating end office informs the originating end office by sending a message via the CCIS network, and the originating end office provides a busy signal to the caller. If the called party is not busy, then the terminating end office informs the originating end office, and a telephone connection is constructed between the caller and the called party.

U.S. Pat. No. 5,920,562, to Christie et al. entitled "Systems and methods for providing enhanced services for telecommunication call" is directed to a method for providing enhanced services for calls over Asynchronous Transfer Mode (ATM) system. Such services include voice messaging, facsimile messaging, mail boxes, voice recognition, conference bridging, calling card, menu routing, prepay card, tone detection and call forwarding. The system includes a service platform system, which interacts with a plurality of communication terminals. The service platform system includes a signaling processor, a service platform and an interworking unit.

The signaling processor receives signaling messages in ATM format from a source terminal, processes them and determines which services the call requires and which operations have to be performed. The signaling processor then sends a signal to the service platform, designating the application to use in order to process the call. The interworking unit receives signals from the source terminal and from the signaling processor, and converts the ATM cells, which it has received from the source terminal, to a form, which is compatible with the service platform. The service platform processes the signal received from interworking unit according to the selected application, and sends the processing results to the signaling processor, and the processed call to the interworking unit. The interworking unit sends the processed call either to the source terminal or to another service platform. The signaling processor sends the processed call either to the target terminal, to the source terminal or to another service platform, according to the control messages included in the processing results.

SUMMARY OF THE PRESENT INVENTION

It is an object of the present invention to provide a novel method and system for management of telephony nodes, which overcomes the disadvantages of the prior art. In accordance with the present invention, there is thus provided a network architecture for establishing telephony connection. The network architecture includes a call management node, a first network node and a second network node. The first network node is coupled to the call management node via a first signaling link, and further coupled to at least one first node telephony subscriber. The second network node is coupled to the call management node via a second signaling link, to the first network node via at least one voice link, and further coupled to at least one second node telephony subscriber.

In accordance with another aspect of the present invention, there is thus provided a method for managing a telephony network. The method includes the steps of determining the destination node identification and the destination node communication link parameters of a destination node and establishing signaling communication between the call management node and the destination node.

The destination node identification and the destination node communication link parameters are determined according to origin node identification and origin node communication link parameters of an origin node. Signaling communication between the call management node and the destination node is established by using the destination node communication link parameters. The origin node communication link parameters and the destination node communication link parameters are directed to a unique communication link between the origin node and the destination node.

In accordance with a further aspect of the present invention, there is thus provided a method for managing a telephony network. The method includes the steps of extracting the destination node identification and destination node communication link parameters of the destination node and establishing signaling communication between the call management node and the destination node.

The destination node identification and destination node communication link parameters are extracted from at least one field in a signaling message received from the origin node. The signaling communication between the call management node and the destination node is established by using the destination node communication link parameters. The origin node determines the origin node communication link parameters. The origin node communication link parameters and the destination node communication link parameters are directed to a unique communication link between the origin node and the destination node.

In accordance with another aspect of the present invention, there is thus provided a call management system. The call management system includes a processor, a storage unit and a signaling interface, wherein the storage unit is coupled to the processor. The storage unit contains a translation table associating the network resources of the first network node with the network resources of second network node. The signaling interface establishes signaling communication to the first network node and to the second network node, wherein the first network node is further coupled to the second network node via a multi-channel connection.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The present invention overcomes the disadvantages of the prior art, by providing a telephony management architecture and method, which directs the actual call straight to the destination network node, and without conveying the actual call toward the managing network module.

Telephony nodes such as high volume switching systems (e.g., a call management system, a control center) routers and telephony control systems (e.g., a PPS) communicate with each other, using telephony protocols such as SS7. Transmitting message from one node to another is called signaling. The ISDN user part (ISUP) layer of SS7 protocol is used for establishing circuit switched connections over which telephony calls are conveyed.

The present invention provides a novel method for operating telephony nodes under SS7 like protocols, which overcomes the disadvantages of the prior art and separates between the signaling path and the call path.

In the following description, the term "signaling link", refers to a channel for carrying signaling and control messages. The terms "connection" or "voice link" herein below refer to a channel for carrying voice/data messages.

Figure 1:
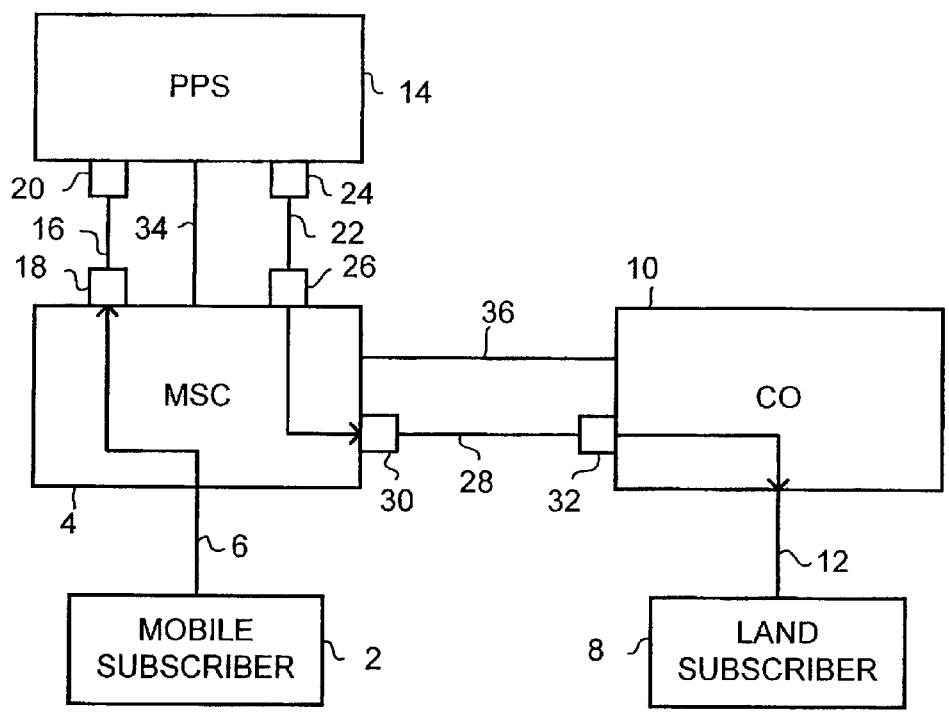
FIG. 1 is a schematic illustration of a system for placing a call between a pre-paid mobile subscriber, and a land subscriber, which is known in the art.
Figure 2:
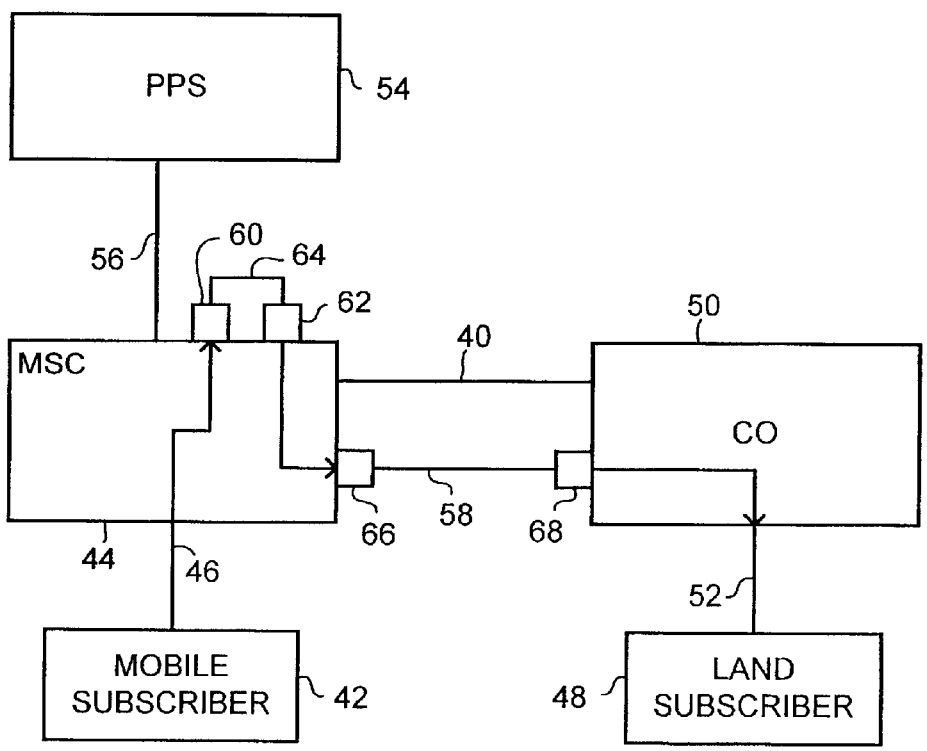
FIG. 2 is a schematic illustration of a system for placing a call between a pre-paid mobile subscriber, and a land subscriber, which is known in the art.
Figure 3:
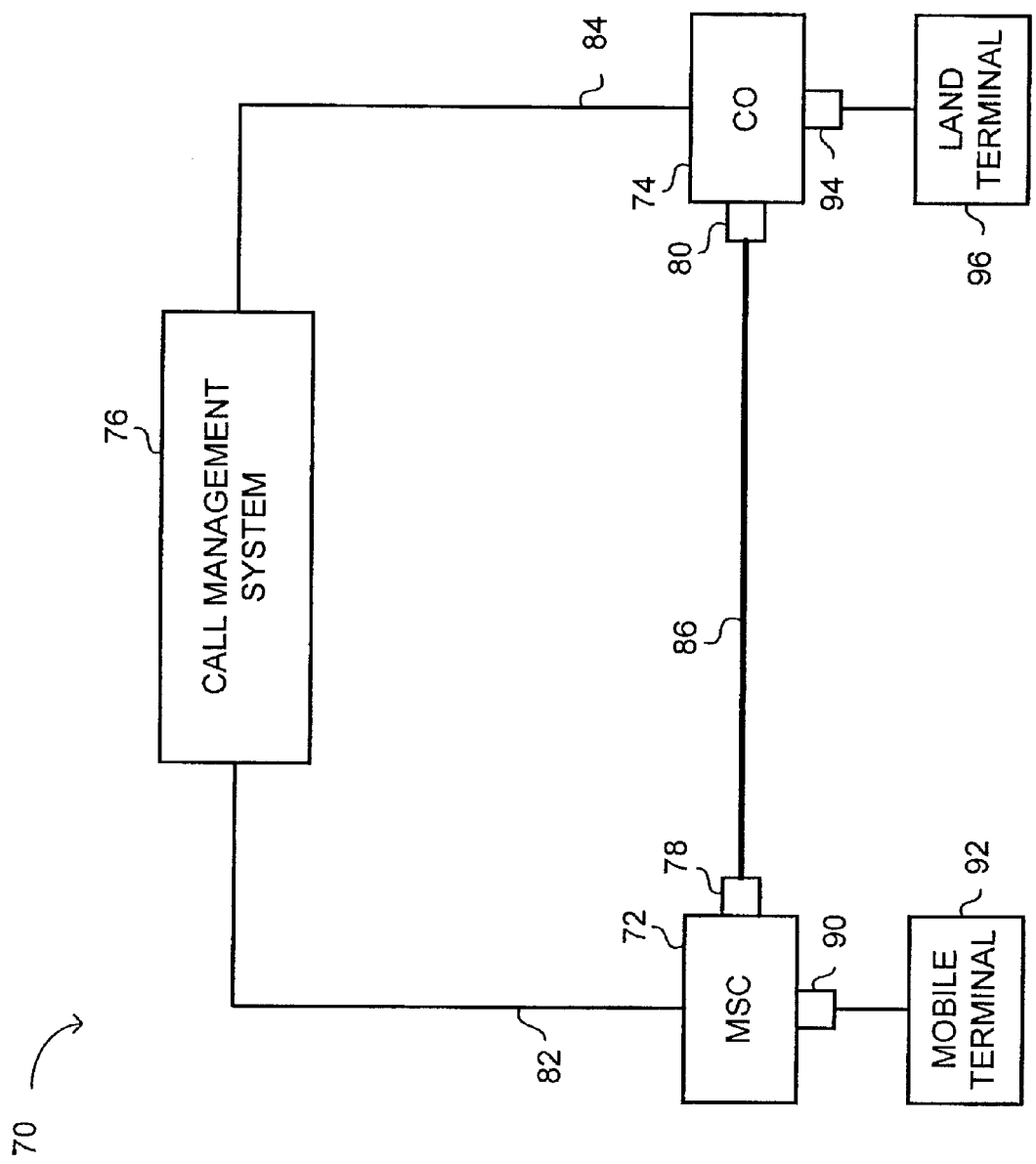
FIG. 3 is a schematic illustration of a system, constructed and operative in accordance with a preferred embodiment of the present invention.

Reference is now made to FIG. 3, which is a schematic illustration of a system, generally referenced 70, constructed and operative in accordance with a preferred embodiment of the present invention. System 70 includes an MSC 72, a CO 74 and a call management system (CMS) 76. MSC 72 includes an MSC port 78. CO 74 includes a CO port 80. CO port 80 and MSC port 78 are coupled by a network connection 86. FIG. 3 illustrates a simple example for a pre-paid service architecture, which reduces the number of ports in MSC 72, which are required for establishing real time monitored telephony call connection to CO 74.

MSC 72 is a telephony communication switch, which serves a plurality of mobile terminal users. CO 74 is a telephony communication switch, which serves a plurality of land terminal users. CMS 76 is a computerized system for providing and managing telephony services such as pre-paid accounts, callback architecture, and the like.

According to the present invention, MSC 72 and CO 74 link to CMS 76 for the purpose of initiating and terminating a telephone call between mobile terminal 92 and land terminal 96, while being directly connected there between (i.e., without any mediation of CMS 76).

In the present example, mobile terminal 92 is associated with a pre-paid account. When mobile terminal 92 initiates a call to land terminal 96, it couples to MSC 72. MSC 72 detects that mobile terminal 92 is associated with a pre-paid account, allocates a port 78 according to the dialed number and a call initiation request to CMS 76. The call initiation request includes source network node parameters respective of MSC 72 and destination network node parameters respective of CMS 76.

Under conventional telephony procedures, a port in one network node is rigidly connected to a respective port in another network node. Accordingly, a port through which a call is to be directed, is associated with the network node (e.g., MSC, CMS, CO and the like) to which the call initiation request is sent to. Hence, in the present example, MSC 72 operates under the assumption that the call is to be directed to CMS 76, while being coupled to CO 74.

CMS 76 authorizes the call according to the account status of mobile terminal 92, processes the information embedded in the call initiation request, determines new destination parameters and produces a new call initiation request. CMS 76 directs that new call initiation request to CO 74. The new call initiation request includes source network node parameters respective of CMS 76 and destination network node parameters respective of CO 74. CMS 76 determines the identification of the destination network node (i.e., the CO 74) from identification of the source network node and from the identification of the network connection, on which the source network node intends to direct the call. The new call initiation request is directed to receiving a call at network connection 86.

Finally, the CO 74 receives the call initiation request, and directs the call from the specified network connection to the land user. Similar to the MSC 72, CO 74 operates under the assumption that the call was received from CMS 76. Hence, CO 74 will direct any signaling activity associated with that call (e.g., call termination instruction—hang up), to CMS 76. Neither MSC 72 nor CO 74 exchanges signaling messages with each other, with respect to that call. Any signaling of CO 74 or MSC 72, which affects the other, has to undergo mediation of CMS 76.

Figure 4:
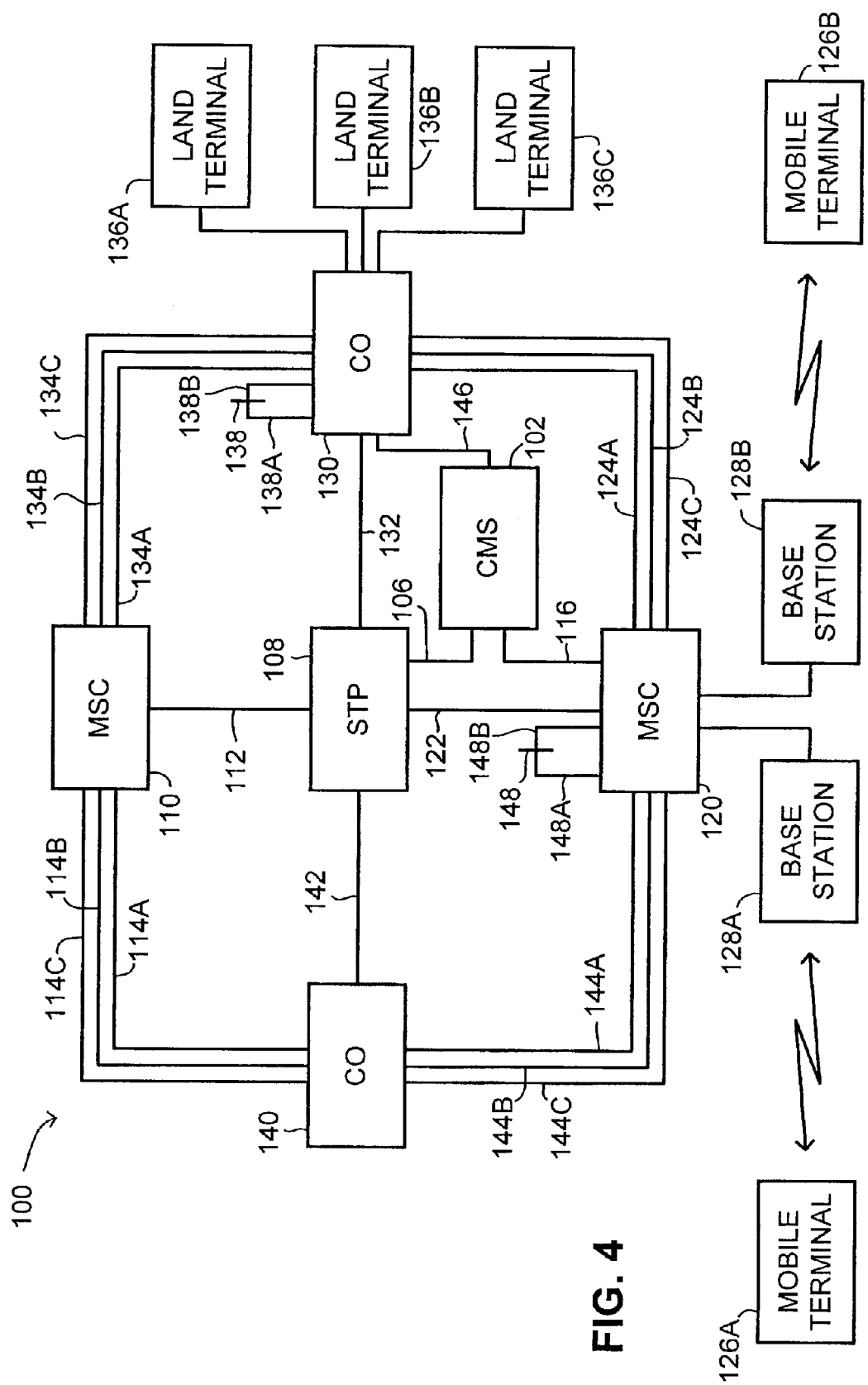
FIG. 4 is a schematic illustration of a system, constructed and operative in accordance with another preferred embodiment of the present invention.

Reference is now made to FIG. 4, which is a schematic illustration of a system, generally referenced 100, constructed and operative in accordance with another preferred embodiment of the present invention. System 100 includes a plurality of network nodes among which are two mobile switching center nodes 110 and 120, two central office nodes 130 and 140 and a call management system (CMS) 102. System 100 further includes a signal transfer point (STP) 108, which is a signaling router, relaying between CMS 102 and service switching points such as nodes 110, 120, 130 and 140.

It is noted that a conventional network architecture utilizes a separate STP unit as gateway for each network node, and in most cases, more than one in parallel, so as to enhance redundancy. In addition, each of the nodes 110, 120, 130 and 140 listed above, represents a setting for a telephony operator and can be replaced by more than one of the same kind. For example, a convention switching node such as an MSC is typically operative to e manage a number of users which is in the order of a few hundreds of thousands. A wireless telephony service provider having a few million subscribers shall construct his internal network from several MSC units, coupled in parallel to an array of STP units, all served by the same CMS unit. A land telephony operator would have a similar networking structure, and would be served by a single CMS unit. None of these internal network structures is addressed in the following disclosure, although in the example, set fourth in FIG. 4, CMS 102 serves two telephony providers, represented by MCS 120 and CO 130. Conventional signaling networks using STP modules can be regarded as multiple access networks (e.g., such as a conventional SS7 network).

In FIG. 4, each of network nodes 110, 120, 130 and 140 has a unique point code assigned thereto, which serves as identification thereof. The following is a point code table for the network nodes of FIG. 4.

TABLE 1

| Network Node | Point Code |
| --- | --- |
| Mobile switching center 110 | 1 |
| Mobile switching center 120 | 2 |
| Central office nodes 130 | 3 |
| Central office nodes 140 | 4 |
| Call management system 102 | 5 |

Mobile switching center nodes 110 and 120 and central office nodes 130 and 140 are coupled to management system (CMS) 102, via STP 108 and respective signaling links 112, 122, 132 and 142. In the example set forth in FIG. 4, signaling links 112, 122, 132 and 142 are SS7 trunks.

Mobile switching center node 110 is connected to central office node 140 via multi channel connections 114A, 114B and 114C. Mobile switching center node 120 is coupled to central office node 130 via multi channel connections 124A, 124B and 124C. Mobile switching center node 110 is coupled to central office node 130 via multi channel connections 134A, 134B and 134C. Mobile switching center node 120 is coupled to central office node 140 via multi channel connections 144A, 144B and 144C. It is noted that the number of channel connections between each of the nodes may vary as well as the type and capacity of each of these channel connections. MSC 120 and CO 130 are further coupled to CMS 102 via respective multi-channel interactive voice recognition connections (IVR) 116 and 146.

In the present example, MSC 120 is further connected to a plurality of mobile terminals 126A and 126B, via a cellular network of cellular base stations 128A and 128B. CO 130 is further connected to a plurality of land telephony terminals 136A, 136B and 136C.

MSC 120 includes a looped multi-channel connection 148 from one port thereon to another, having two sections 148A and 148B. MSC 120 considers each of sections 148A and 148B as a separate multi-channel connection, directed outwardly. CO 130 includes, a looped multi-channel connection 138 from one port thereon to another, having two sections 138A and 138B. CO 130 considers each of sections 138A and 138B as a separate multi-channel connection, directed outwardly.

Each of the multi channel connections 114A, 114B, 114C, 124A, 124B, 124C 134A, 134B, 134C 144A, 144B, and 144C is operative: to convey a plurality of communication sessions such as telephone calls, using multiplexed communication. For example, channel connection 114A is an E1 type trunk, which defines a plurality of time slots thereon, where each time slot can be assigned to a different telephone call session. A circuit identification code (CIC) points to a specific one of these time slots. In a selected network node, a circuit identification code uniquely defines the multi-channel connection assigned thereto, in a plurality of multi-channel connections directed to a selected other network node. The following is a CIC allocation table for MSC 120.

TABLE 2

| CIC | Channel Connection | Point Code |
|---|---|---|
| 100–399 | 124A | 5 |
| 400–999 | 124B | 5 |
| 1000–1299 | 124C | 3 |
| 1000–1499 | 144A | 5 |
| 1500–2200 | 144B | 4 |
| 3000–3999 | 144C | 4 |
| 2000–2499 | 148A | 5 |
| 2500–2999 | 148B | 5 |

The following is a CIC allocation table for CO 130.

TABLE 3

| CIC | Channel Connection | Point Code |
|---|---|---|
| 100–399 | 124A | 5 |
| 1400–1999 | 124B | 5 |
| 2000–2299 | 124C | 5 |
| 3000–3499 | 134A | 5 |
| 100–999 | 134B | 1 |
| 1000–1999 | 134C | 1 |

TABLE 3-continued

| CIC | Channel Connection | Point Code |
|---|---|---|
| 2300–2499 | 138A | 5 |
| 2500–2699 | 138B | 5 |

As can be seen from the above tables 2 and 3, the present invention allows for various network nodes to have different circuit identification codes for the same trunk For example, MSC 120 assigns circuit identification codes in the range 400–999 for network connection (trunk) 124B, while CO 130 assigns circuit identification codes in the range 1400–1999 for that same network connection.

Furthermore, the present invention provides non symmetrical relations, such as in the case of multi channel connection 124C. When node 120 initiates a call on multi channel connection 124C, it signals directly to node 130. But when node 130 initiates a call on multi channel connection 124C, it signals to CMS 102. Such a case may exist in a pre-paid architecture, where the recipient (connected to node 120) pays for incoming calls as well. In that case, node 120 can direct calls of non pre-paid terminals directly to node 130 using multi channel connection 124C.

Node 130, however, not containing any information relating to terminals connected to node 120, cannot distinguish between a pre-paid mobile terminal and a non pre-paid one. Hence, when a mobile terminal pays for incoming calls, the call can be directed in two ways. The first way is using the disclosed technique, whereby node 130 establishes a signaling link with CMS 102 and operates as if the voice links are connected to CMS 102. CMS 102 detects if the destination terminal is associated with a pre-paid, account and manages the call accordingly. The second way uses conventional methods where node 130 establishes a signaling link to node 120, which then directs the signaling link to CMS 102, using a full voice connection or a looped around one.

This flexibility of assignment of circuit identification codes is achieved by including a special look-up table in CMS 102, which can determine a destination point code (DPC) and a circuit identification code thereof according to the originating point code and the circuit identification code of the originating point code (OPC). The following is a partial example of such a look-up table, respective of the network connection which exists between MSC 120 and CO 130.

TABLE 4

| Origin | | Network | Destination | |
|---|---|---|---|---|
| OPC | CIC | Connection | DPC | CIC |
| 2 | 100–399 | 124A | 3 | 100–399 |
| 2 | 400–999 | 124B | 3 | 1400–1999 |
| 3 | 100–399 | 124A | 2 | 100–399 |
| 3 | 1400–1999 | 124B | 2 | 400–999 |
| 3 | 2000–2299 | 124C | 2 | 1000–1299 |
| 2 | 2000–2499 | 148 | 2 | 2500–2999 |
| 2 | 2500–2999 | 148 | 2 | 2000–2499 |
| 3 | 2300–2499 | 138 | 3 | 2500–2699 |
| 3 | 2500–2699 | 138 | 3 | 2300–2499 |

It is noted that when both network nodes define the same circuit identification codes, for all of the network connection there between, as in the case of trunk 124A, the column of the destination circuit identification code can be eliminated, since this information already exists in the origin circuit identification codes column.

When one network node has to establish a telephone call connection to another network node, it sends a call initiation request to that other network node including a plurality of parameters, such as source, destination, and the like.

Figure 5A:
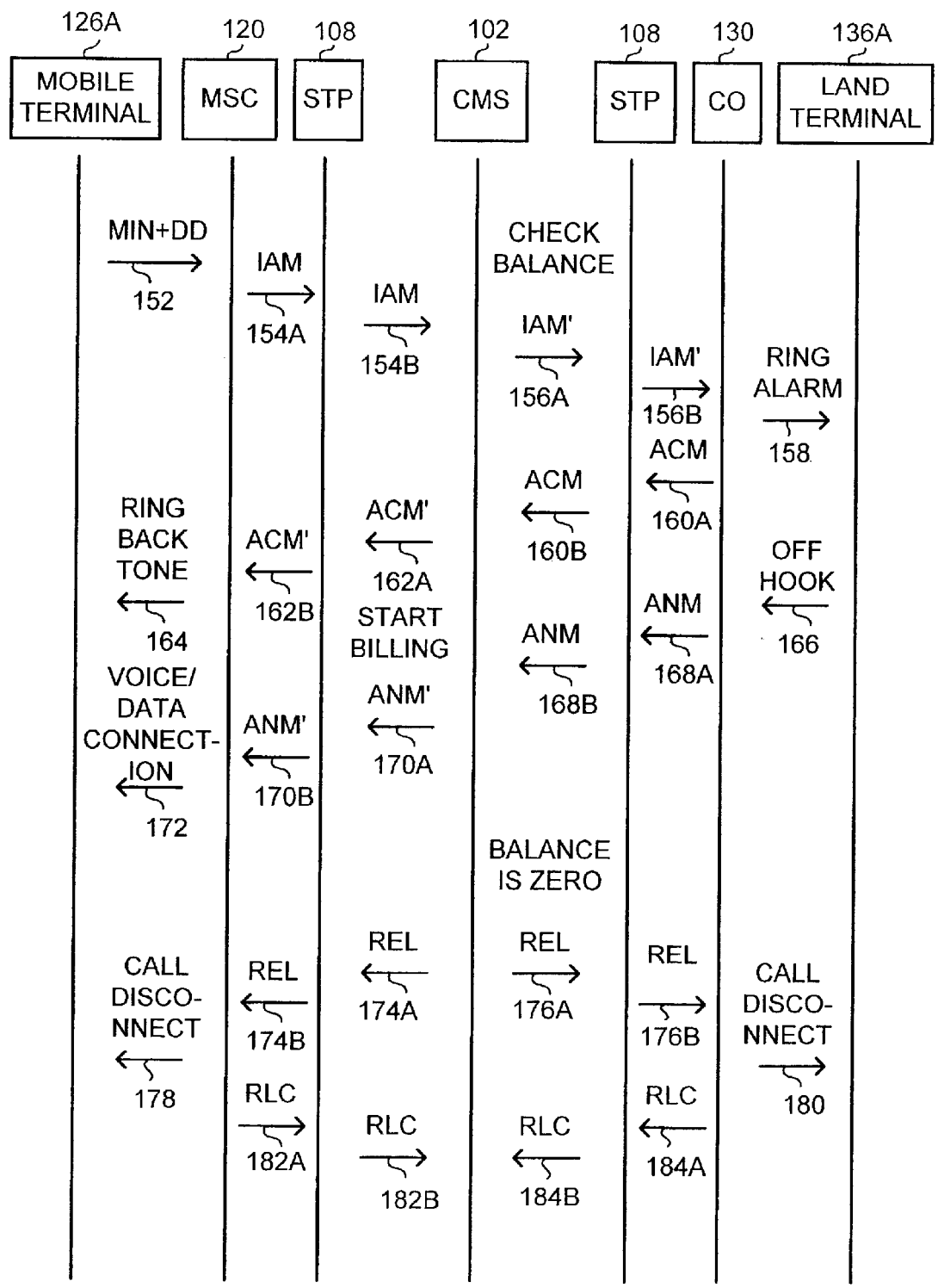
FIG. 5A is a schematic illustration of a message flow diagram, operative in accordance with a further preferred embodiment of the present invention, wherein a mobile terminal initiates a call.

Reference is further made to FIG. 5A, which is a schematic illustration of a message flow diagram, operative in accordance with a further preferred embodiment of the present invention, wherein a mobile terminal initiates a call. The flow diagram presented in FIG. 5A is an example of an implementation of the disclosed technique, in SS7 protocol. In SS7 protocol, a call initiation request is called an initial address message (IAM), and includes a plurality of data fields, among which are the following:

Originating point code (OPC), which is the identification of the network node, which originated the message.

Destination point code (DPC), which is the identification of the network node, which the message is sent to.

Circuit identification code (CIC), which is the identification of the physical network connection, on which the call is supposed to be established.

Dialed digits (DD).

Calling line identifier (CLI), which is the phone number of the subscriber that originated the call.

The message flow diagram of FIG. 5A provides an example for establishing a telephone call between mobile terminal 126A and land terminal 136A, where mobile terminal 126A is associated with a pre-paid program. Hence, all calls which are billed to mobile terminal 126A have to be monitored in real time, so as to determine if at one point in time the cost of the call exceeds the credit in the account of mobile terminal 126 and further to provide warning beforehand.

Mobile terminal 126A couples to MSC 120 and provides the mobile identification number (MIN) thereof, as well as dialed digits (DD) which the user mobile terminal user keyed in (referenced 152). In the present example, the dialed digits include the identification number of land terminal 136A, which may also include a prefix respective of CO. MSC 120 detects that mobile terminal 126A is associated with a pre-paid account. This can be achieved for example, by assigning a predetermined range of numbers for all of the pre-paid mobile terminals, assigned to MSC 120. It is noted that if the mobile terminal is associated with a regular account (i.e., not a pre-paid), then MSC 120 can establish a call directly to the destination node without the mediation of CMS 102 (e.g., a call from mobile terminal 126B, which has regular account, to land terminal 136A, may be performed by using conventional signaling directly to CO 130, allocating a CIC on trunk 124C).

MSC 120 allocates a CIC for that call, produces an initial address message (IAM) referenced 154A and directs it to CMS 102. STP 108 routes IAM 154A to CMS 102 as IAM 154B. The content of IAM 154A and IAM 154B is substantially identical. The IAM message includes the following parameters:

| IAM (MSC-CMS) | | | | |
|---|---|---|---|---|
| OPC | DPC | CLI | DD | $CIC_{OPC}$ |
| 2 | 5 | 456456 | 789789 | 500 |

It is noted that the term $CIC_{OPC}$ and the term $CIC_{DPC}$, which will be presented further below, are unique for the disclosed technique, since the signaling protocol portion of SS7 does not distinguish between the CIC of the originating node and the CIC of the destination node. These terms are used in the disclosed technique for explanation purposes only.

It is noted that MSC 120 operates under the assumption that CIC 500 is used for coupling to CMS 102, as specified in the above table 2.

CMS 102 receives IAM 154B, detects that the calling subscriber is a pre-paid one, according to the CLI content and authorizes the call according to the status of the account. CMS 102 further accesses table 4 with the received OPC and $CIC_{OPC}$ parameters and retrieves DPC and respective $CIC_{DPC}$ parameters, which are DPC=3 and $CIC_{DPC}$=1500.

CMS 102 produces a new initial address message (IAM') referenced 156A, and directs it to CO 130. STP 108 routes IAM' 156A to CO 130 as IAM' 156B. The content of IAM' 156A and IAM'156B is substantially identical. The IAM' 156A message includes the following parameters:

| IAM' (CMS-CO) | | | | |
|---|---|---|---|---|
| OPC | DPC | CLI | DD | $CIC_{DPC}$ |
| 5 | 3 | 456456 | 789789 | 1500 |

CO 130 receives the IAM', allocates CIC 1500 and detects the current state of land terminal 136A (i.e., on-hook, off-hook, and the like). When land terminal 136A is available for receiving the call, then CO 130 initiates a ring alarm, referenced 158, at land terminal 136A and provides acknowledgement to the node which requested the call—CMS 102, in the form of an address complete message (ACM) 160A. It is noted that CO 130 operates under the assumption that CIC 1500 is used for coupling to CMS 102, as specified in the above Table 3. STP 108 routes ACM 160A to CMS 102 as ACM 160B. The content of ACM 160A and ACM 160B is substantially identical. The ACM 160A message includes the following parameters:

| ACM (CO-CMS) | | |
|---|---|---|
| OPC | DPC | $CIC_{DPC}$ |
| 3 | 5 | 1500 |

CMS 102 receives the ACM 160B from CO 130, produces a new address complete message (ACM') 162A and directs it to MSC 120. STP 108 routes ACM' 162A to MSC 120 as ACM' 162B. The content of ACM' 162A and ACM' 162B is substantially identical.

The ACM message includes the following parameters:

| ACM' (CMS-MSC) | | |
|---|---|---|
| OPC | DPC | $CIC_{DPC}$ |
| 5 | 2 | 500 |

MSC 120 receives ACM' 162B and initiates a ring back tone for the mobile terminal 126A. When the user at land terminal accepts the call and picks up the phone, then land terminal 136A sends an answer message (ANM) 166 to CO 130, which in turn directs it to CMS 102 via STP 108 (references 168A and 168B).

At this point, CMS 102 starts billing the account associated with mobile terminal 126A. It is noted that the actual billing record can be made retroactively to the point in time where CMS 102 received IAM 154B, or to any other point, according to the billing policy associated with that account.

CMS 102 translates the OPC, DPC and CIC parameters of the received ANM, produces a new ANM' referenced 170A and directs it to MSC 120 via STP 108 (referenced 170B). At this point, both MSC 120 and CO 130 use the same voice link using respective circuit identification codes (500 and 1500, respectively), and a voice telephone call (referenced 172) is established between mobile terminal 126A and land terminal 136A. It is noted that according to the architecture of the disclosed technique, MSC 120 allocates only two CICs, one for mobile terminal 126A and another for coupling to CO 130. No CIC is allocated to or from CMS 102, by either node. Hence, the architecture of the present invention significantly reduces the amount of network resource, which have to be allocated for establishing a real-time monitored call such as one of a pre-paid service.

As states above, MSC 120 as well as CO 130, operate under the assumption that the node at the other end is CMS 102 and hence direct all signaling messages thereto. Since CMS 102 receives all of the signaling messages provided by these two nodes 120 and 130, it is able to monitor every logical aspect of the call. CMS 102 starts billing the pre-paid account when these nodes provide notification that a call was established there between. CMS 102 can stop billing when one of the nodes provides notification that the terminal connected thereto, is in "hang-on" status. Measuring the time length of the call, CMS 102 can detect when the account reaches a balance of zero, provide warning thereto beforehand via multichannel interactive voice recognition connection 116, and terminate the call as will be described herein below.

When CMS 102 detects that the account reaches a balance of zero, it produces two release messages (REL) 174A and 176A to MSC 120 and CO 130, respectively. STP routes RELs 174A and 176A to their respective destination nodes as REL messages 174B and 176B. When MSC 120 receives REL 174B, it dis-allocates CIC 500, thereby disconnecting (referenced 178) the call for mobile terminal 126A, and further sends a release complete message (RLC) 182A to CMS 102, via STP 108. The RLC 182A message includes the following parameters:

| RLC (MSC-CMS) | | |
|---|---|---|
| OPC | DPC | CIC$_{DPC}$ |
| 2 | 5 | 500 |

When CO 130 receives REL 176B, it dis-allocates CIC 1500, disconnects (referenced 180) the call for land terminal 136A, and further sends a release complete message (RLC) 184A to CMS 102, via STP 108. STP routes RLC messages 182A and 184A as RLC messages 182B and 184B. RLC 184A message includes the following parameters:

| RLC (CO-CMS) | | |
|---|---|---|
| OPC | DPC | CIC$_{DPC}$ |
| 3 | 5 | 1500 |

CMS 102 receives RLC messages 182B and 184B as confirmations that both nodes terminated the call and that the respective CICs are not allocated.

Figure 5B:
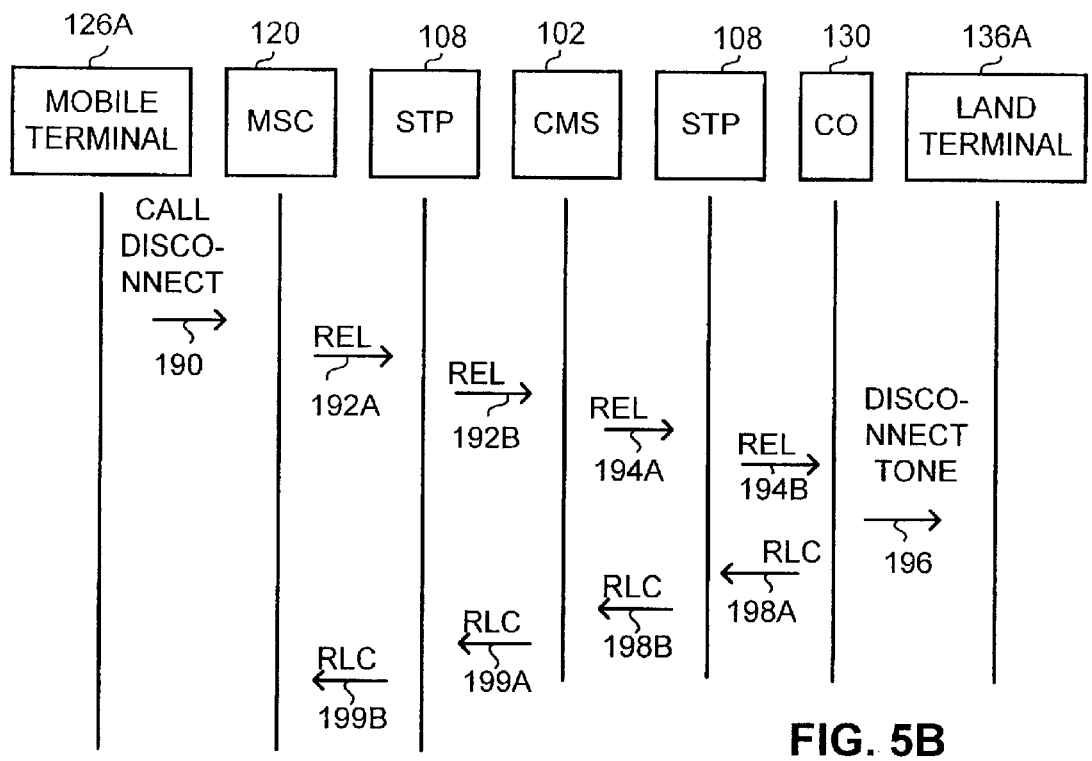
FIG. 5B is a schematic illustration of a supplemental portion of the message flow diagram of FIG. 5A, wherein a mobile terminal terminates the call.

Reference is further made to FIG. 5B, which is a schematic illustration of a supplemental portion of the message flow diagram of FIG. 5A, wherein a mobile terminal terminates the call. The sequence presented in the flow diagram of FIG. 5B commences right after the voice/data connection state 172 of FIG. 5A, and instead of the call termination sequence portion which starts at stage 174A and ends at stage 184B.

When the mobile user performs a "hang up" operation (e.g., presses END button, closes flipper portion of the phone, and the like) for indicating his intention for terminating the telephone call session, mobile terminal 126A sends MSC 120 a call disconnect message 190. MSC 120, operating under the assumption that he is coupled to CMS 102, transmits an REL message 192A to CMS 102 via STP 108. STP 108 routes REL message 192A to CMS 102, as a REL message 192B. MSC 120 further dis-allocates CIC 500. The REL 192A message includes the following parameters:

| REL (MSC-CMS) | | |
|---|---|---|
| OPC | DPC | CIC$_{OPC}$ |
| 2 | 5 | 500 |

CMS 102 receives the REL 192B from MSC 120, produces a release message (REL) 194A and directs it to CO 130, via STP 108. STP 108 routes REL 194A to CO 130 as REL 194B. REL 194A message includes the following parameters:

| REL (CMS-CO) | | |
|---|---|---|
| OPC | DPC | CIC$_{DPC}$ |
| 5 | 3 | 1500 |

When CO 130 receives REL 194, it dis-allocates CIC 1500, thereby disconnecting (referenced 196) the call for land terminal 136A. operating under the assumption that CIC 1500 is coupled to CMS 102, CO 130 further sends a release complete message (RLC) 198A to CMS 102, via STP 108. STP routes RLC message 198A to CMS 102 as RLC message 198B. The RLC 198A message includes the follow parameters:

| RLC (CO-CMS) | | |
|---|---|---|
| OPC | DPC | $CIC_{DPC}$ |
| 3 | 5 | 1500 |

CMS 102 receives RLC message 198B as confirmations (i.e., together with RLC 192B) that both nodes terminated the call and that the respective CICs are not allocated. To complete the sequence, MSC 120 has to receive confirmation that the other party released the call. accordingly, CMS 102 produces and sends an RLC message 199A to MSC 120, via STP 108. STP routes RLC message 199A to CMS 102 as RLC message 199B. The RLC 199A message includes the following parameters:

| RLC (CMS-MSC) | | |
|---|---|---|
| OPC | DPC | $CIC_{OPC}$ |
| 5 | 2 | 500 |

MSC 120 receives RLC 199B and dis-allocates CIC 500 for that call.

Figure 5C:
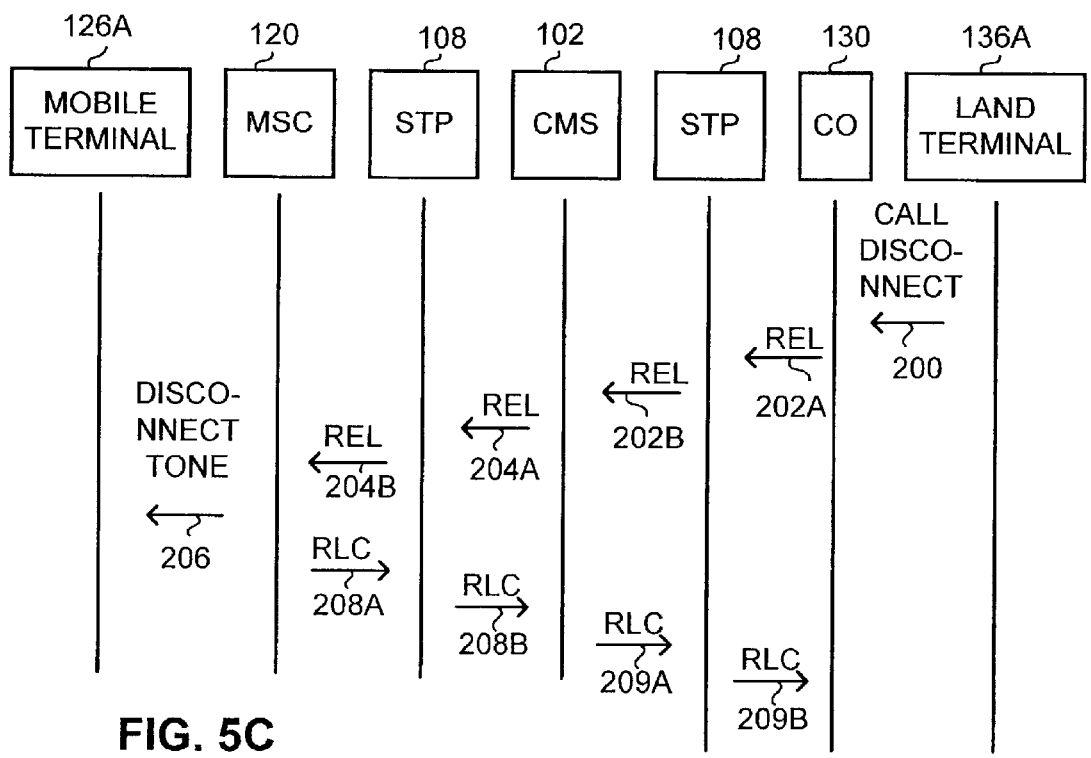
FIG. 5C is a schematic illustration of a supplemental portion of the message flow diagram of FIG. 5A, wherein a land terminal terminates the call.

Reference is further made to FIG. 5C, which is a schematic illustration of a supplemental portion of the message flow diagram of FIG. 5A, wherein a land terminal terminates the call. The sequence presented in the flow diagram of FIG. 5C commences right after the voice/data connection state 172 of FIG. 5A, and instead the call termination sequence portion which starts at stage 174A and ends at stage 184B.

When the land terminal user hangs up land terminal 136A for terminating the telephone call session, land terminal 136A sends CO 130 a call disconnect message 200. CO 130, operating under the assumption that CIC 1500 is coupled to CMS 102, transmits a REL message 202A to CMS 102 via STP 108. STP 108 routes REL message 202A to CMS 102, as a REL message 202B. CO 130 further dis-allocates CIC 1500. The REL 202A message includes the following parameters:

| REL (CO-CMS) | | |
|---|---|---|
| OPC | DPC | $CIC_{DPC}$ |
| 3 | 5 | 1500 |

CMS 102 receives the REL 202B from CO 130, produces a release messages (REL) 204A and directs it to MSC 120, via STP 108. STP 108 routes REL 204A to MSC 120 as REL 204B. At this point CMS 102 may stop billing the account of mobile terminal 126A. REL 204A message includes the following parameters:

| REL (CMS-MSC) | | |
|---|---|---|
| OPC | DPC | $CIC_{OPC}$ |
| 5 | 2 | 500 |

When MSC 120 receives REL 204B, it dis-allocates CIC 500, thereby disconnecting (referenced 206) the call for mobile terminal 126A. operating under the assumption that CIC 500 is connected to CMS 102, MSC 120 further sends a release complete message (RLC) 208A to CMS 102, via STP 108. STP routes RLC message 208A to CMS 102 as RLC message 208B. The RLC 208A message includes the following parameters:

| RLC (MSC-CMS) | | |
|---|---|---|
| OPC | DPC | $CIC_{OPC}$ |
| 2 | 5 | 500 |

CMS 102 receives RLC message 208B as confirmations (i.e., together with RLC 202B) that both nodes terminated the call and that the respective CICs are not allocated. To complete the sequence, CO 130 has to receive confirmation that the other party released the call. Accordingly, CMS 102 produces and sends an RLC message 209A to CO 130, via STP 108. STP routes RLC message 209A to CO 130 as RLC message 209B. RLC 209A message includes the following parameters:

| RLC (CMS-CO) | | |
|---|---|---|
| OPC | DPC | $CIC_{DPC}$ |
| 5 | 3 | 1500 |

CO 130 receives RLC 209B and dis-allocates CIC 1500 for that call.

It is important to note that the management of that call at network level, remains at all times in the hands of CMS 102. Hence, CMS 102 significantly reduces the load over the switches, which initiate the calls.

Figure 6:
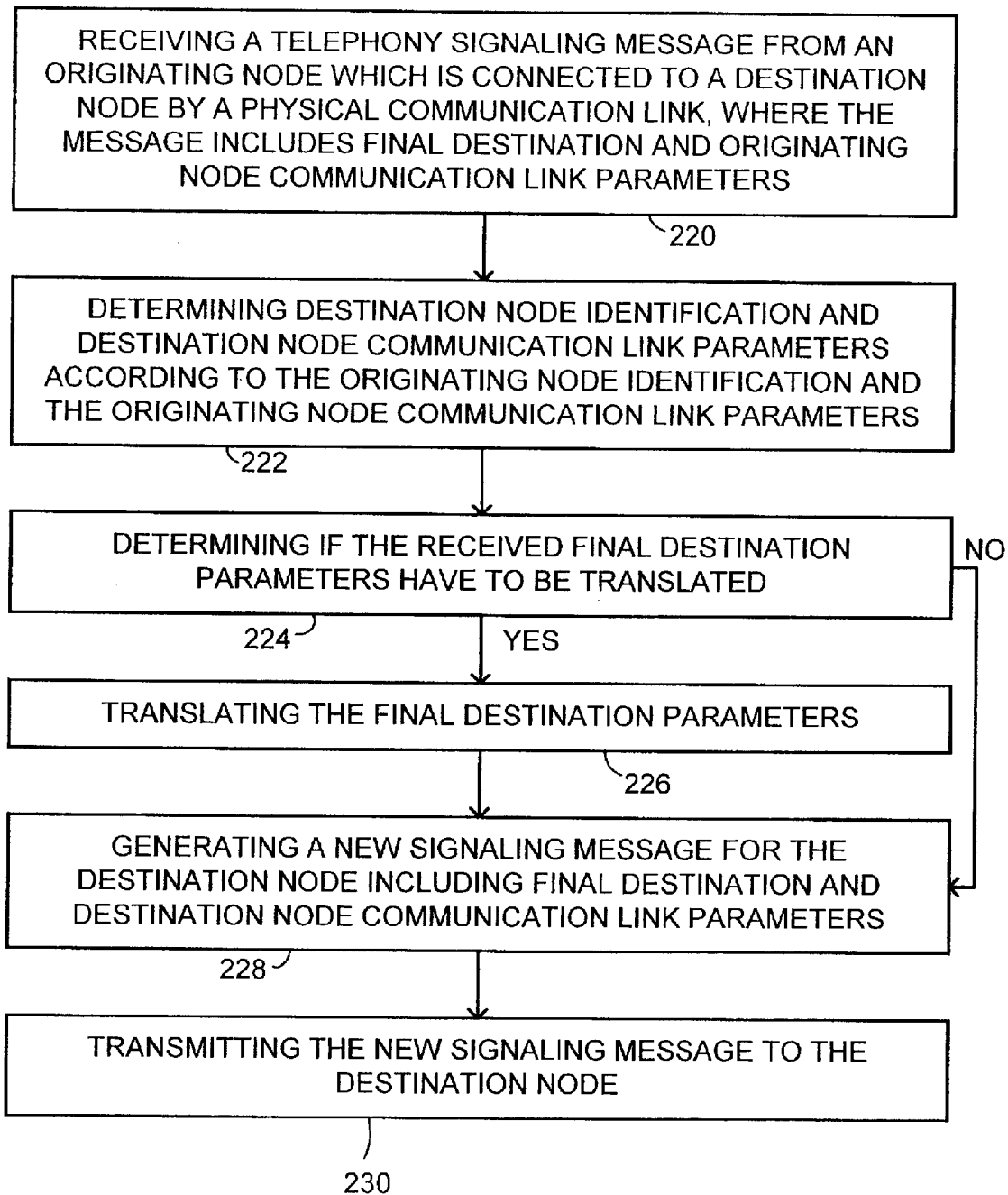
FIG. 6 is a schematic illustration of a method for operating the call management system of FIG. 4, operative in accordance with a further preferred embodiment of the present invention.

Reference is further made to FIG. 6, which is a schematic illustration of a method for operating CMS 102 of FIG. 4, operative in accordance with a further preferred embodiment of the present invention.

In step 220, a telephony-signaling message is received from an originating node, which is coupled to a destination node by a physical communication link. The telephony signaling message includes final destination and originating node communication link parameters. With reference to FIGS. 4, 5A, 5B and 5C, IAM 154B is one example of such a message. CMS 102 receives IAM 154B (alias 154A) sent by MSC 120, which is actually coupled to CO 130, where the message includes CIC parameters which are is associated with multi channel connection 124A. Other examples such a received message include ACM 160B, RLC 182B, RLC 184B, RLC 192B, RLC 198B, RLC 202B and RLC 208B.

In step 222, a destination node identification and destination node communication link parameters are determined, according to the originating node identification and the originating node communication link pararheters. With reference to FIG. 4, CMS 102 accesses table 4, and retrieves the DPC and $CIC_{DPC}$ parameters therefrom.

It is noted that CMS 102 can further include a dialed number translation table, for example for translating an "800" number, which is typically virtual, to a respective regular number. In such a case, CMS 102 accesses a translation table, and determines if the destination number, which was embedded in DD portion of the CLI, has to be translated (step 224). When translation is required, then CMS 102 translates (step 226) the received number embedded in the DD portion of the CLI and provides the respective destination telephone number in the IAM' which is later sent to the destination node. Otherwise, CMS 102 proceeds to step 228.

In step 228, a new signaling message is generated, for the destination node. The new signaling message includes final destination and destination node communication link parameters. With reference to FIGS. 5A, 5B and 5C, IAM' 156A is one example of such a message. CMS 102 transmits IAM' 156A (which is further directed and received as IAM' message 156B) to CO 130, where CO 130 is actually coupled to MSC 120. IAM' 156A includes CIC parameters of a CIC, which is associated with multi channel connection 124A. Other examples of such a message include ACM' 162A, ANM' 170A, REL 174A, REL 176A, REL 194A and REL 204A.

In step 230, the new signaling message is transmitted to the destination node. With reference to FIG. 4, CMS 102 transmits the newly converted message to the respective node, via STP 108.

The disclosed technique also provides the establishment of pre-paid calls within a specific node (e.g., from one subscriber to another, where both are connected to the same node). In the following example, land terminal 136C calls land terminal 136B. CO 130, sends an IAM message to CMS 102 including the following parameters:

| IAM (CO-CMS) | | | | |
|---|---|---|---|---|
| OPC | DPC | CLI | DD | $CIC_{OPC}$ |
| 3 | 5 | 456456 | 456457 | 2330 |

As described above, CO 130 operates under the assumption that CIC 2330 is used for coupling to CMS 102, as specified in Table 3 above.

CMS 102 receives the IAM, detects that the calling subscriber is a pre-paid one, according to the CLI content and authorizes the call according to the status of the account. CMS 102 further accesses table 4 with the received OPC and $CIC_{OPC}$ parameters and retrieves DPC and respective $CIC_{DPC}$ parameters, which are DPC=3 and $CIC_{DPC}$=2530.

CMS 102 produces a new initial address message, and directs it to CO 130. The IAM' message includes the following parameters:

| IAM' (CMS-CO) | | | | |
|---|---|---|---|---|
| OPC | DPC | CLI | DD | $CIC_{DPC}$ |
| 5 | 3 | 456456 | 456457 | 2530 |

CO 130 receives the IAM', allocates CIC 2530 and detects the current state of land terminal 136B (i.e., on-hook, off-hook, and the like). The rest of the process is similar to the one described in conjunction with FIG. 5A, only that CO 130 replaces MSC 120. The result is that CMS 102 establishes a call in CO 130, between land terminals 136B and 136C, over multi-channel connection 138.

When a terminal of a network switching node requests establishment of voice telephony communication with another terminal of the same network switching node, the above procedure is performed using a looped multi-channel connection 148 at that network switching node. For example, when mobile terminal 126A, associated with a pre-paid account, calls mobile terminal 126B, then MSC 120 signals to CMS 102, with a CIC associated with section 148A. CMS 102 translates that CIC to a respective CIC associated with section 148B, and establishes a voice link there between. It is noted that during this procedure, MSC 120 operates under the assumption that one call is directed from mobile terminal 126A toward CMS 102 and another call is directed from CMS 102 to mobile terminal 126B. Furthermore, MSC 120 holds no record relating between these two calls, which are hence managed by CMS 102. A similar procedure can be performed over looped multi-channel connection 138 with respect to land terminals 136A, 136B and 136C.

Figure 7:
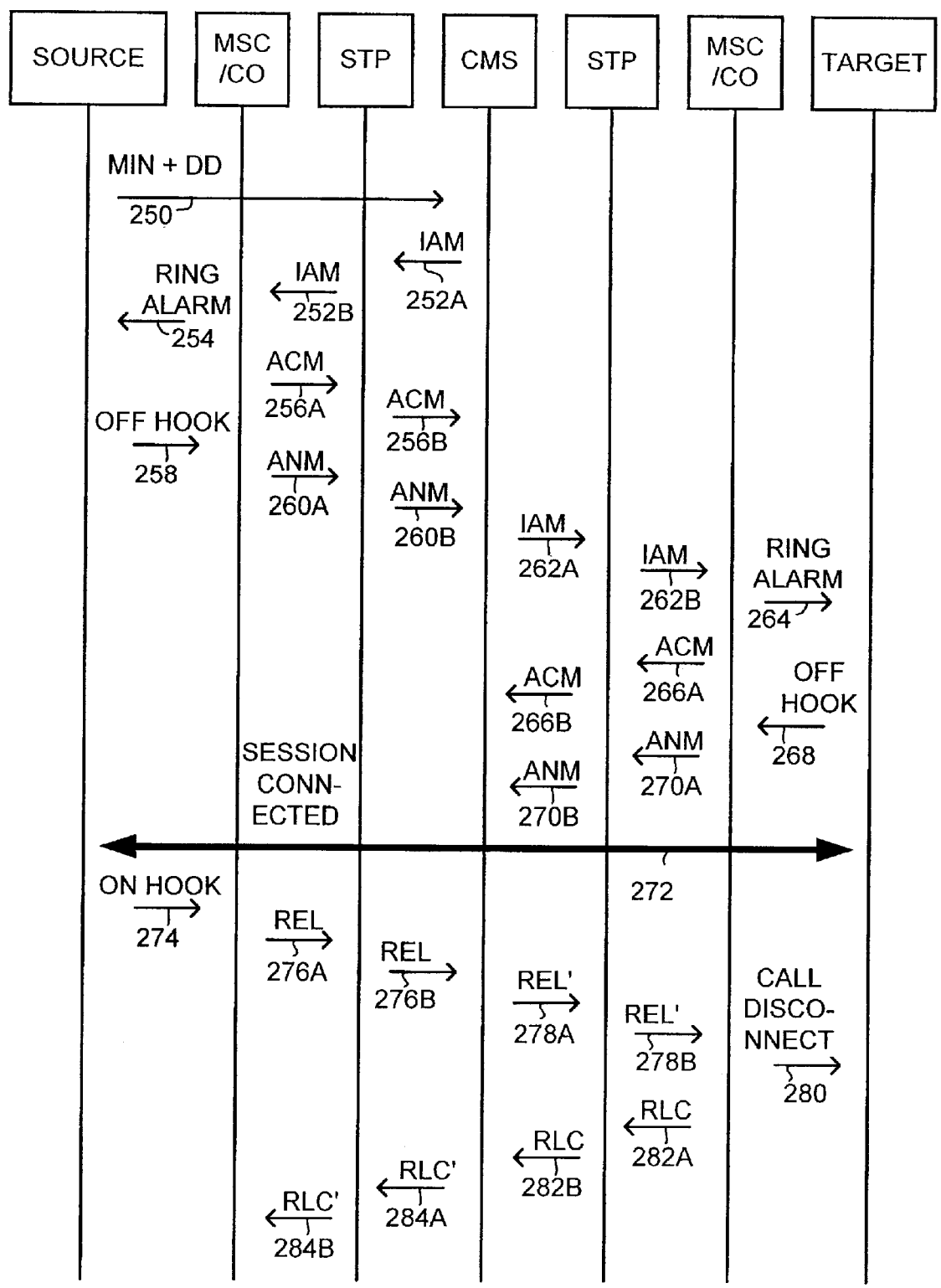
FIG. 7 is a schematic illustration of a callback message flow diagram, operative in accordance with another preferred embodiment of the present invention.
Figure 8:
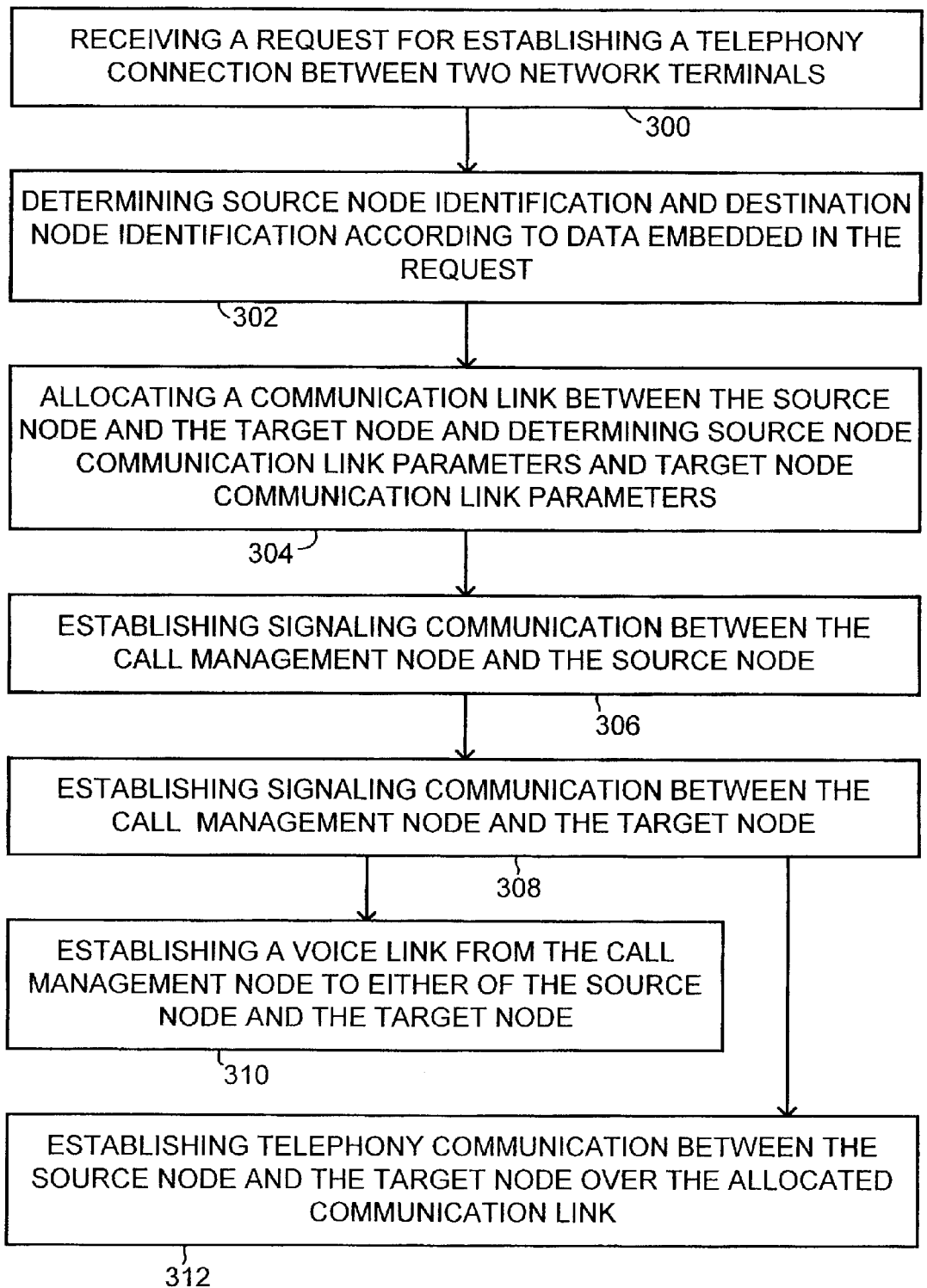
FIG. 8 is a schematic illustration of a method for operating the call management system of FIG. 4, operative in accordance with a further preferred embodiment of the present invention.

Reference is now made to FIGS. 7 and 8. FIG. 7 is a schematic illustration of a callback message flow diagram, operative in accordance with another preferred embodiment of the present invention. FIG. 8 is a schematic illustration of a method for operating CMS 102 of FIG. 4, operative in accordance with a further preferred embodiment of the present invention.

The method presented in FIG. 8 addresses a case where the call management system conducts the signaling procedures for both of the nodes, which are to be connected. In the example set forth in FIG. 7, the request for establishing the call is received from one of the nodes to be connected although it could be received from any other source such as a web related module (a web site), an external database and the like.

The flow of FIG. 7 can be executed in a networking architecture such as presented in FIG. 4, for establishing a callback session between any two terminals, each being connected to a network switching node (e.g., each node can either be an MSC or a CO). The example presented in FIG. 7 addresses a situation for establishing a callback session between land terminal 136A of CO 130 and mobile terminal 126B of MSC 120.

In step 300, a request for establishing a telephony connection between two network terminals is received. With reference to FIGS. 4 and 7, at first the user sends a request 250 to the CMS, for establishing a callback session, where the message includes the mobile identification number (MIN) and the dialed digits (DD). These parameters identify the source and target, which are to be connected. The request is sent digitally by means, which may be included as a service in the telephony system, such as SMS, or external thereto, such as from an Internet web-site.

In step 302, a source node identification and a target node, identification are determined according to the data embedded in the request. With reference to FIG. 4, CMS 102 accesses table 4 and determines a source node (of the requesting party) and a target node (for the target), according to the data embedded in the request. After determining the identification of the source node and the target node, a communication link is allocated and respective communication parameters for both the source node and the target node are determined (step 304). It is noted that the terms source and target can refer to a plurality of situations where one of these nodes is connected to a terminal which is to participate in the final call and the other node is merely a gateway through which the call is to be further transferred to another network, such as in the case of international calls. In the example of an international callback account, the CMS 102 allocates a voice communication link between the final destination terminal node and the international telephony gateway associated with the callback account. The international telephony gateway has to further establish the route to the terminal of the user associated with the callback account and provide confirmation thereof to CMS 102.

With reference to FIG. 4, CMS 102 can retrieve these parameters and perform the initial allocation therein, using table 4. The physical allocation is performed later in the source and target nodes, according to the parameters provided from CMS 102.

In step 306, signaling communication is established between the call management node and the source node. With reference to FIGS. 4 and 7, CMS 102 produces an IAM message 252A and directs it to the source terminal network-switching node (e.g., CO 130), via STP 108. STP 108 routes the IAM message 252A to CO 130 as an IAM message 252B, where both IAM messages are substantially identical. The IAM message includes the following parameters:

| IAM (CMS-CO) | | | | |
|---|---|---|---|---|
| OPC | DPC | CLI | DD | $CIC_{OPC}$ |
| 5 | 3 | 456456 | 987987 | 1700 |

CO 130 receives the IAM 252B message, initiates a ring alarm (referenced 254) at the source terminal (i.e., land terminal 136A), generates an ACM message 256A and directs it to CMS 102 via STP 108. STP 108 routes the ACM message 256A to CMS 102 as ACM message 256B, where both ACM messages are substantially identical. At this stage, the user of the land terminal 136A responds to the ring alarm and sets the terminal off-hook (referenced 258). In turn, CO 130 produces an ANM message 260A and directs it to CMS 102, via STP 108. STP 108 routes the ANM message 260A to CMS 102 as an ANM message 260B, where both ANM messages are substantially identical.

In step 308, signaling communication is established between the call management node and the target node. With reference to FIGS. 4 and 7, CMS 102 receives ANM 260B and in turn, produces another IAM message 262A and directs it to the target source terminal network-switching node (e.g., MSC 120), via STP 108. STP 108 routes the IAM message 262A to MSC 120 as an IAM message 262B, where both IAM messages are substantially identical. The IAM message includes the following parameters:

| IAM (CMS-MSC) | | | | |
|---|---|---|---|---|
| OPC | DPC | CLI | DD | $CIC_{OPC}$ |
| 5 | 2 | 987987 | 456456 | 700 |

MSC 120 receives the IAM 262B message, initiates a ring alarm (referenced 264) at the source terminal (i.e., land terminal 136A), generates an ACM message 266A and directs it to CMS 102 via the STP 108. STP 108 routes ACM message 266A to target terminal network switching node as an ACM message 266B, where both ACM messages are substantially identical. At this stage, the user of the mobile terminal 126B responds to the ring alarm and sets the terminal off hook referenced 268. In turn, MSC 120 produces an ANM message 270A and directs it to CMS 102, via STP 108. STP 108 routes the ANM message 270A to CMS 102 as an ANM message 270B, where both ANM messages are substantially identical.

In step 310, a voice link is established from the call management node to either of the source node and the target node. This voice link can be used for inducing voice messages between the network management node and a terminal connected to either the source or target nodes or for receiving further commands from the users operating the terminals connected to either of the source or the target nodes.

In step 312, telephony communication is established between the source node and the target node over the allocated communication link. With reference to FIGS. 4 and 7, at this point, a session is established between CO 130 (CIC 1700) and MSC 120 (CIC 700), over multi-channel connections 124B. where each of CO 130 and MSC 120 operates under the assumption that it is coupled to CMS 102.

Telephony A telephony connection release can be initiated according to a plurality of procedures, initiated either by each of the terminals involved in that connection or by the call management node (CMS 102), similar to those described in conjunction with FIGS. 5A, 5B and 5C. The following example addresses a procedure in which the user operating the source terminal, initiates the telephony connection release, by setting his terminal to be "On Hook" (referenced 274). In turn, the source node produces a REL command 276A and directs it to CMS 102 via STP 108 as REL 276B. it is noted that the source node operates under the assumption that it is coupled to CMS 102 by the voice trunk.

CMS 102 receives REL 276B, translates the source and destination parameters, produces a REL' 278A and directs it to the target node via STP 108, as REL' 278B. The target node disconnects the call (referenced 280), produces an RLC message 282A and directs it to CMS 102 via STP 108, as RLC 282B. CMS 102 receives RLC 282B translates the source and destination parameters embedded therein, produces an RLC' 284A and directs it to the source node via STP 108, as RLC' 284B. the source node receives RLC' 284B as confirmation, which enables final dis-allocation of the telephony resources (i.e., the CIC).

Figure 9:
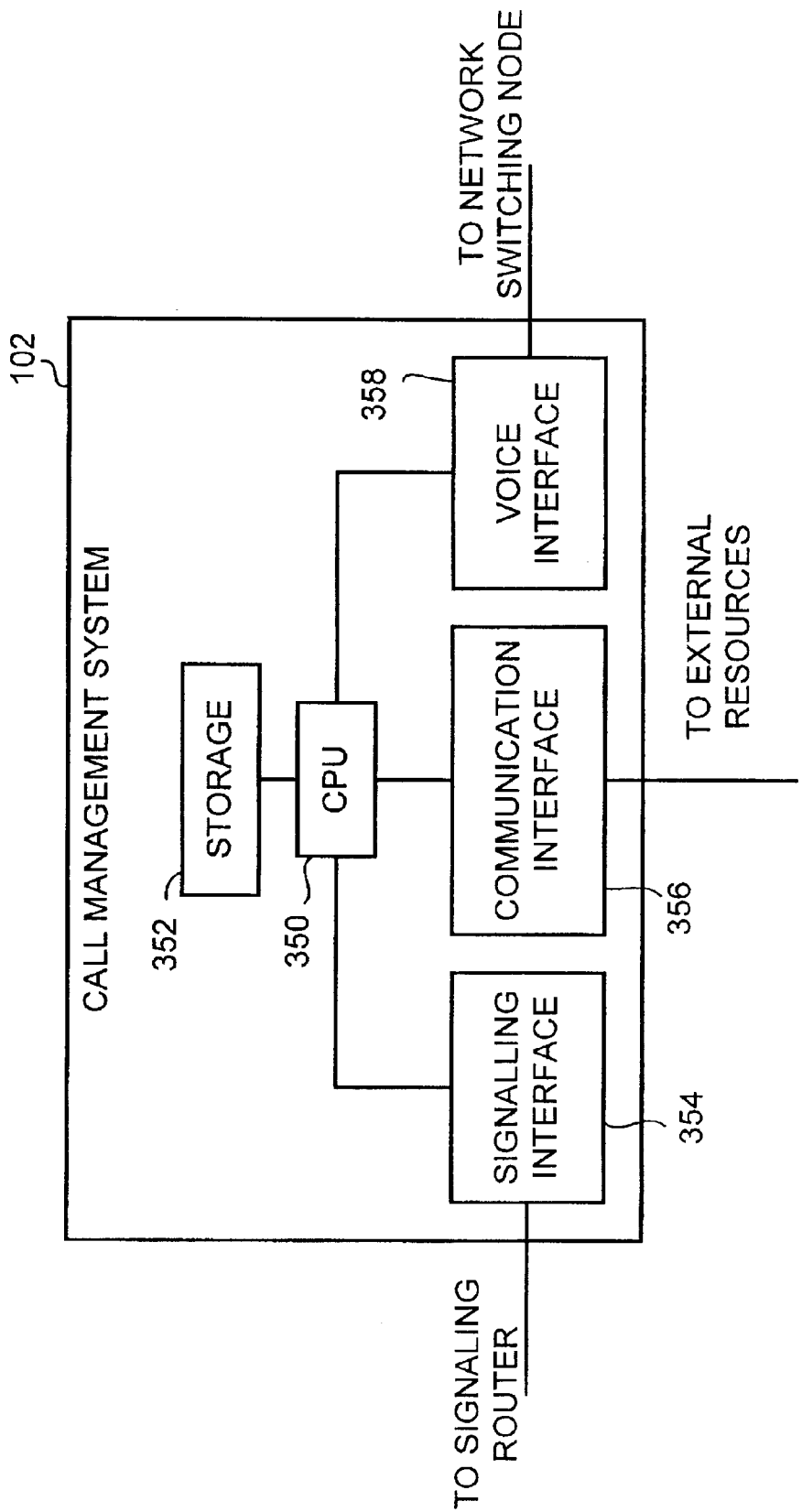
FIG. 9 is a schematic illustration of the call management system of FIG. 4, constructed and operative in accordance with another preferred embodiment of the invention.

Reference is further made to FIG. 9, which is a schematic illustration of call management system 102 of FIG. 4, constructed and operative in accordance with another preferred embodiment of the invention. CMS 102 includes a CPU 350, a storage unit 352, a signaling interface 354, a voice interface 358 and a general communication interface 356. CPU 350 is coupled to storage unit 352, signaling interface 354, voice interface 358 and to general communication interface 356. Signaling interface 354 further couples to a telephony-signaling network, typically via a routing architecture using STP modules. It is noted that signaling interface 354 can be used for establishing signaling communication with a plurality of nodes due to the routed nature of signaling communication.

Voice interface 358 is used for coupling to selected network nodes, for the purpose of exchanging voice elements with the user of a selected terminal, via dedicated voice channels such as the ones referenced 116 and 146 in FIG. 4. Such voice exchange can include vocal alerts which are provided to the user, respective of the account state thereof, vocal informative messages for notifying the user of the status of the call or the terminal at the other end, requests which are directed to the user for providing specific commands to the call management system, and the like. Accordingly, voice interface 358 can further be used for receiving commands from the user, either using DTMF signals or by using voice recognition and analysis procedures.

General communication interface 356 is used for connecting to external modules such as databases, supervision nodes and the like.

Call management system 102 is a node, which controls and manages telephony calls using signaling communication, without conveying the actual call there through. Network nodes, which communicate with CMS 102 using signaling communication, operate under the assumption that they are also, coupled to CMS 102 by telephony voice trunks.

In the above disclosed technique, the call management system manages a call, while being a node which the other nodes are aware of, either as the originating node or the destination node. According to another aspect of the present invention, the call management system is operative to manage a call, while non of the other nodes, participating in the call, are aware of its existence. According to this aspect of the invention, the call management system produces signaling nodes, which The above disclosed technique can be used for rerouting telephone calls, according to various parameters. For example, CMS 102 can be used for managing an eight hundred (800) number routing service. In this case, a switching network node provides the 800 number as dialed by the user at the terminal connected thereto, to CMS 102. This number is conventionally a virtual number, which does not exist on any network node and has to be translated to a physical line. CMS 102 analyses the dialed digits and determines a destination network node and terminal number within the destination node, which are associated with that virtual number. CMS 102 further determines a CIC for the origin node and the destination node and provides it to the destination node together with the terminal number It is noted that the terminal number can be a selected line within a trunk of lines, which for example is coupled to a call center PBX. At the same time, CMS 102 notifies the originating node with respect to the selected CIC.

Figure 10:
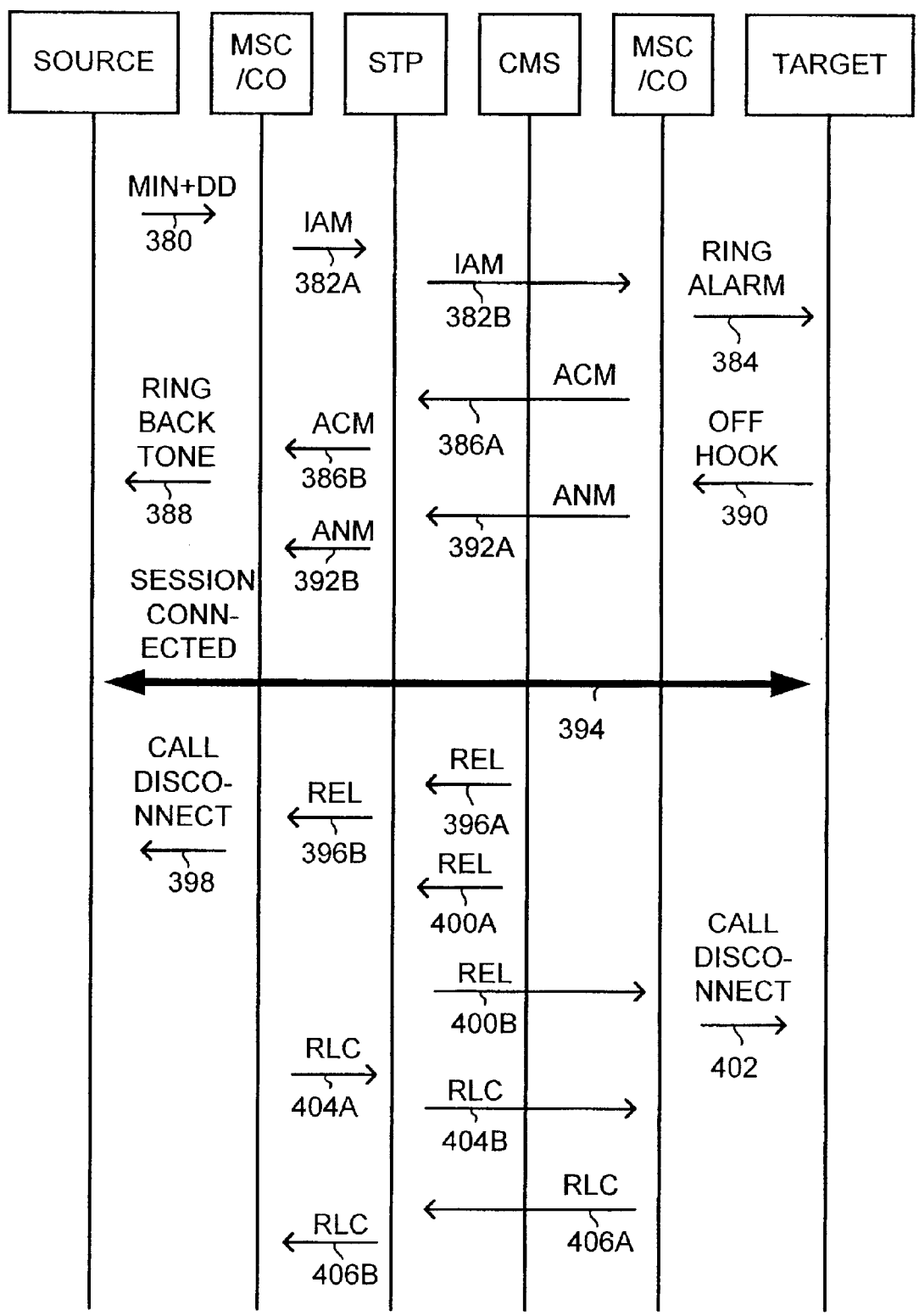
FIG. 10 is a schematic illustration of a message flow diagram for terminating an on-going call between two remote network nodes, operative in accordance with a further preferred embodiment of the present invention.
Figure 11:
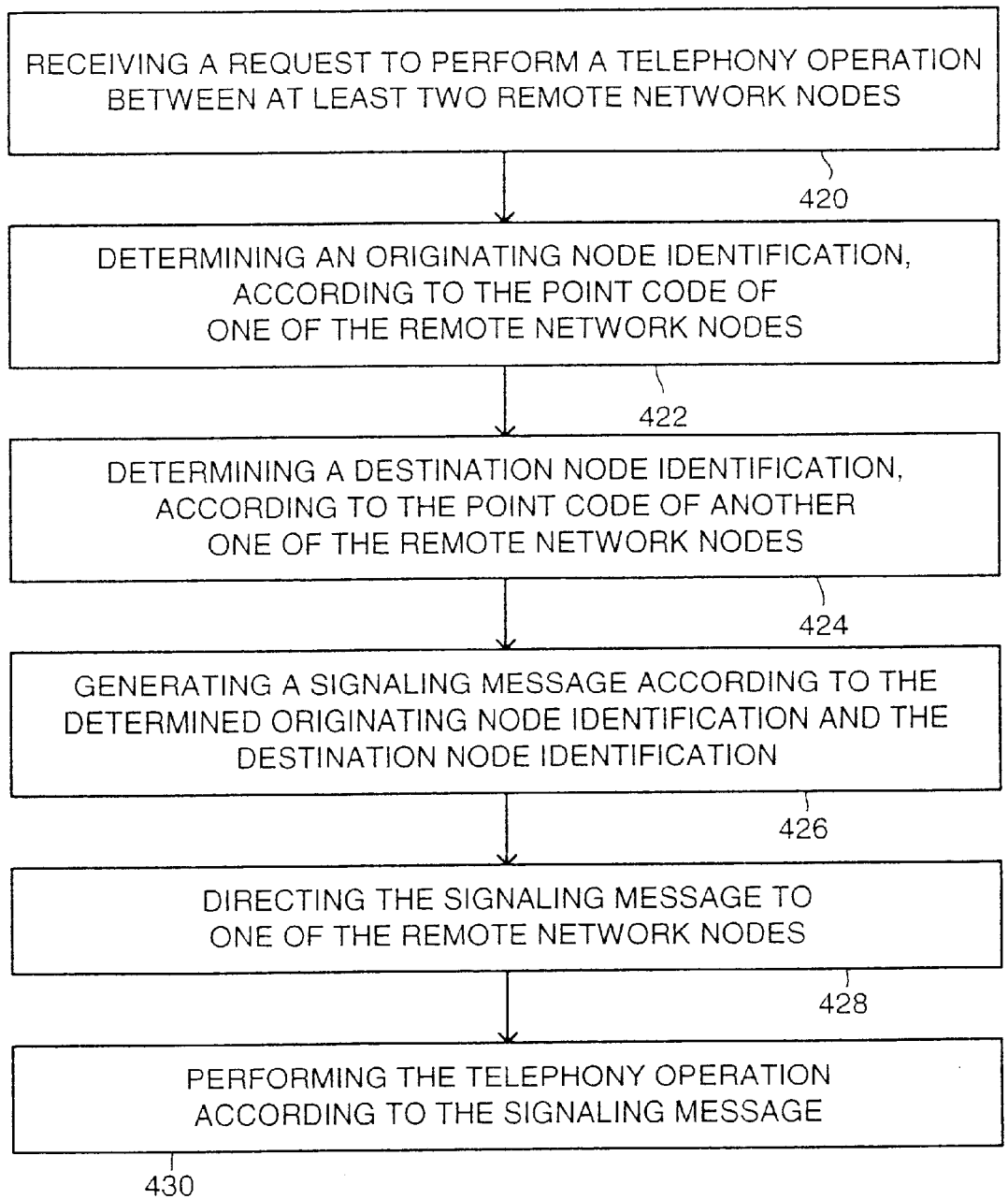
FIG. 11 is a schematic illustration of a method for operating the CMS of FIG. 4, operative in accordance with another preferred embodiment of the present invention.

Reference is now made to FIGS. 10 and 11. FIG. 10 is a schematic illustration of a message flow diagram for terminating an on-going call between two remote network nodes, operative in accordance with a further preferred embodiment of the present invention. FIG. 11 is a schematic illustration of a method for operating CMS 102 of FIG. 4, operative in accordance with another preferred embodiment of the present invention. The call is previously established between a source terminal, connected to one network switching node and a target terminal, connected to another network switching node. In the following example, the source terminal is a mobile terminal (not shown) connected to MSC 110 (FIG. 4) and the target terminal is a land terminal (not shown) connected to CO 140.

The flow of FIG. 10 can be executed in a networking architecture such as presented in FIG. 4, for performing a node telephony operation on a call session between any two network switching nodes (e.g., each node can be an MSC or a CO). The example presented in FIG. 10 addresses a situation wherein the node telephony operation includes terminating an on-going call between a mobile terminal of MSC 110 and a land terminal of CO 140. MSC 110 and CO 140 are two network-switching nodes, which are remote relative to CMS 102. The mobile terminal connected to MSC 110 establishes a conventional call session, directly with the land terminal connected to CO 140, without any mediation by CMS 102.

At a later stage CMS 102 receives a request to terminate the call. Such a request can be directed to CMS 102 by a monitoring unit within MSC 110, CO 140 or any other network node associated with the call, a monitoring unit which resides in a signaling junction such as STP 108 (e.g., a monitoring sniffer unit), and the like. The monitoring unit detects for example, that the call between MSC 110 and CO 140 is not permissible. When the monitoring unit detects a non-permissible call establishment is in progress, then the monitoring unit can transmit a request to the call management system, to prevent that call session from being established. The monitoring unit can transmit the call to the call management system, using special communication channels (e.g., Ethernet, ATM, TCP/IP, X25 and the like), or in a signaling message, while embedding the call parameters within selected SS7 fields.

The following is a partial CIC allocation table for CO 140.

TABLE 6

| CIC | Channel Connection | Point Code |
|---|---|---|
| 100–299 | 114A | 1 |
| 300–799 | 114B | 1 |
| 800–1500 | 114C | 1 |

The following is a partial CIC allocation table for MSC 110.

TABLE 7

| CIC | Channel Connection | Point Code |
|---|---|---|
| 100–299 | 114A | 4 |
| 300–799 | 114B | 4 |
| 800–1500 | 114C | 4 |

Initially, the user of the mobile terminal sends a request to MSC 110 for establishing a call (reference 380), where the message includes the mobile identification number (MIN) and dialed digits (DD). The parameters identify the source and the target, which are to be connected. MSC 110 produces an IAM message 382A and directs it to the target terminal network-switching node (e.g., CO 140), via STP 108. STP 108 routes the IAM message 382A to CO 140 as an IAM message 382B, where both IAM messages are substantially identical. The IAM message includes the following parameters:

| IAM (MSC-CO) | | | | |
|---|---|---|---|---|
| OPC | DPC | CLI | DD | $CIC_{OPC}$ |
| 1 | 4 | 654654 | 321321 | 1100 |

CO 140 receives the IAM 382B message, initiates a ring alarm (referenced 384) at the target terminal, generates an acknowledgement message (ACM) 386A and directs it to MSC 110 via STP 108. STP 108 routes the ACM message 386A to MSC 110 as ACM message 386B, where both ACM messages are substantially identical. The ACM message includes the following parameters:

| ACM (CO-MSC) | | |
|---|---|---|
| OPC | DPC | $CIC_{OPC}$ |
| 4 | 1 | 1100 |

MSC 110 receives the ACM message 386B, and it initiates a ring back tone 388 at the mobile terminal. At this point the user of the target terminal responds to the ring alarm and sets the terminal off hook (referenced 390). In turn, CO 140 produces an ANM message 392A and directs it to MSC 110, via STP 108. STP 108 routes the ANM !message 392A to MSC 110 as an ANM message 392B, where both ANM messages are substantially identical. At this point, a session (reference 394) is established between MSC 110 (CIC 1100) and CO 140 (CIC 1100), over multi-channel connection 114C, without any mediation by CMS 102.

In step 420, a request to perform a telephony operation between at least two remote network nodes is received. In the following example, CMS 102 receives a request to terminate the call between MSC 110 and CO 140. According to one aspect of the invention, the request includes all of the parameters which are required for terminating the call, such as the point codes of the source and target nodes, the CIC on which the session call was established, and the like. Alternatively, the request can include only partial formation, where CMS 102 includes the complementary information.

In step 422, an originating node identification is determined according to the point code of one of the remote network nodes. According to the information embedded in the request, CMS 102 determines an originating node identification to be the point code of one of the remote network nodes. In the present example, the point code of CO 140 (four) is determined as the originating node identification.

In step 424, a destination node identification is determined according to the point code of another one of the remote network nodes. With reference to FIG. 4, CMS 102 determines a destination node identification to be the point code of the other of the remote network nodes. In the present example, the point code of MSC 110 (one) is determined as the destination node identification.

In step 426, a signaling message is generated according to the determined originating identification and the destination node identification. With reference to FIG. 4, CMS 102 generates a release message (REL) 396A, which includes the following parameters:

| REL (CMS-MSC) | | |
| --- | --- | --- |
| OPC | DPC | CIC |
| 4 | 1 | 1100 |

It is noted that REL 396A does not include any information relating to CMS 102. According to the disclosed technique, CMS 102 produces a signaling message to MSC 110, which appears to be sent from another node (i.e., from CO 140).

Conventional telephony permits a situation where two connected nodes send release messages to each other at the same time. Such a situation can occur when two terminals, each connected to a different node, hang up on each other. Each of the nodes, not yet receiving the release message of the other node, produces a release message and directs it to the other node. Upon receiving a release message from the other node, each of the nodes produces an RLC message and directs it to the other node.

In the example set forth in FIG. 10, CMS 102 also generates a REL message 400A, directed to CO 140. REL message 400A includes the following parameters:

| REL (CMS-CO) | | |
| --- | --- | --- |
| OPC | DPC | CIC |
| 1 | 4 | 1100 |

It is noted that REL 400A does not include any information relating to CMS 102. CMS 102 produces signaling message 400A to CO 140, where signaling message 400A appears to be sent from MSC 110.

In step 428, the signaling message is directed to one of the remote network nodes. With reference to FIG. 4, CMS 102 directs REL message 396A to MSC 110 via STP 108. STP 108 directs REL message 396A to MSC 110, as REL message 396B. It is noted that, since the signaling network is a multiple access network, STP 108 does not have any indication that the REL message 396A was received from a node other than CO 140, unless the message is received from a communication line which is not associated with CO 140.

The example set forth in FIG. 10 involves two messages and hence, CMS 102 performs a similar procedure for REL 400A. CMS 102 directs REL message 400A to CO 140 via STP 108. STP 108 directs REL message 400A to CO 140, as REL message 400B. Again, since the signaling network is a multiple access network, STP 108 does not have any indication that the REL message 400A was received from a node other than MSC 110, unless the message is received: from a communication line which is not associated with MSC 110.

In step 430, the telephony operation is performed according to the signaling message. The telephony operation is performed without any reference to the node, which initiated it (i.e., CMS 102). With reference to FIGS. 4 and 10, MSC 110 receives REL 396B, disconnects (reference 398) the mobile terminal, and produces an RLC message 404A. RLC message 404A includes the following parameters:

| RLC (MSC-CO) | | |
| --- | --- | --- |
| OPC | DPC | $CIC_{OPC}$ |
| 1 | 4 | 1100 |

Since the OPC field of REL 396B included the point code of CO 140, MSC 110 operates under the assumption that CO 140 sent REL 396A, where REL 396A was originally sent by CMS 102. Hence, MSC 110 directs the release confirmation (RLC) message 404A to CO 140, via STP 108. STP 108 directs RLC 404A to CO 140 as RLC 404B.

In the example set forth in FIG. 10, CO 140 receives REL 400B, disconnects (reference 402) the land terminal, and produces an RLC message 406A. RLC message 406A includes the following parameters:

| RLC (CO-MSC) | | |
| --- | --- | --- |
| OPC | DPC | $CIC_{OPC}$ |
| 4 | 1 | 1100 |

Since the OPC field of REL 400B included the point code of MSC 110, CO 140 operates under the assumption that MSC 110 sent REL 400A, where REL 400A was originally sent by CMS 102. Hence, CO 140 directs the release confirmation (RLC) message 406A to MSC 110, via STP 108. STP 108 directs RLC 406A to MSC 110 as RLC 406B.

Accordingly, each of the network nodes (i.e., MSC 110 and CO 140) releases the system resources (CIC 1100), and the call is disconnected.

Other situations can include a call which is established over a plurality of nodes, for example between a mobile terminal associated with MSC 120 and a mobile terminal associated with MSC 110, through CO 140. The call is directed from MSC 120 to CO 140 via a selected CIC over multi channel connection 144B and from CO 140 to MSC 110 over multi channel connection 114A. In this case, CMS 102 can disconnect the call over any one of the two multi-channel connections involved in the call, or over both of them.

It is noted that the disclosed above technique can be extended to a plurality of telephone functions such as callback, telephone cards, collect calls, and the like.

It will be appreciated by persons skilled in the art that the present invention is not limited to what has been particularly shown and described hereinabove. Rather the scope of the present invention is defined only by the claims, which follow.

What is claimed is:

1. Network architecture for establishing a telephony connection comprising:
   a call management node;
   a first network node, coupled to said call management node via a first signaling link and further coupled to at least one first node telephony subscriber;
   a second network node, coupled to said call management node via a second signaling link, to said first network node via at least one voice link, and further coupled to at least one second node telephony subscriber,
   wherein said first network node defines said call management node as a logical destination node for physically connecting via said at least one voice link.

2. The network architecture according to claim 1 wherein said second network node defines said call management node as a logical destination node for physically connecting via said at least one voice link.

3. The network architecture according to claim 1 wherein said second network node defines said first network node as the destination node for said at least one voice link.

4. The network architecture according to claim 1 wherein said call management node defines said second network node as the destination node for said at least one voice link.

5. The network architecture according to claim 1 wherein said call management node includes a data structure for associating signaling destination information respective of said first network node with signaling destination information respective of said second network node.

6. The network architecture according to claim 1 wherein said data structure includes signaling destination information having at least the fields selected from the list consisting of:
   first network node point code;
   second network node point code;
   first network node resource identification;
   first network node circuit identification code;
   second network node resource identification;
   second network node circuit identification code;
   resource group identification; and
   trunk identification.

7. The network architecture according to claim 6 wherein said second network node point code is embedded in the dialed digits field of a signaling message.

8. The network architecture according to claim 6 wherein said second network node point code is embedded in a selected field of a signaling message.

9. The network architecture according to claim 1 wherein said call management node is further coupled to said first network node via multi-channel interactive voice recognition connection.

10. The network architecture according to claim 1 wherein said call management node is further coupled to said second network node via multi-channel interactive voice recognition connection.

11. The network architecture according to claim 1 wherein said first signaling link and said signaling link are established over a multiple access network.

12. The network architecture according to claim 1 wherein e said first network node is further coupled to said second network node via at least one additional voice link, and via an additional signaling link,
   wherein said first network node defines said second network node as the destination node for said at least one additional voice link and said second network node defines said first network node as the destination node for said at least one additional voice link.

13. The network architecture according to claim 1 wherein said call management node directs a signaling message to a selected one of said first network node and said second network node.

14. The network architecture according to claim 1 wherein at least a selected one of said first network node and said second network node includes a looped multi-channel connection,
   wherein said selected network node defines a first set of resource identification parameters for one end of said looped multi-channel connection and a second set of resource identification parameters for the other end of said looped multi-channel connection.

15. The network architecture according to claim 14 wherein said call management node translates resource identification parameters of said first set of resource identification parameters to resource identification parameters of said second set of resource identification parameters.

16. The network architecture according to claim 15 wherein said call management node establishes a voice link over said looped multi-channel connection.

17. Method for managing a telephony network comprising the steps of:
   in a network management node, determining destination node identification and destination node physical communication link parameters of a destination node, according to origin node identification and to origin node Physical communication link parameters of an origin node; and
   establishing signaling communication between a said network management node and said destination node, said signaling communication embedding said destination node physical communication link parameters,
   wherein said origin node physical communication link parameters and said destination node physical communication link parameters are directed to a unique physical communication link between said origin node and said destination node.

18. The method according to claim 17, further comprising the step of establishing signaling communication between said call management node and said origin node using said origin node communication link parameters.

19. The method according to claim 17, further comprising the preliminary step of receiving said origin node identification and said origin node communication link parameters.

20. The method according to claim 17, further comprising the preliminary step of receiving said origin node identification and said origin node communication link parameters from said origin node.

21. The method according to claim 17, further comprising the preliminary step of determining said origin node identification and said origin node communication link parameters.

22. The method according to claim 21, further comprising the preliminary step of receiving a request to establish telephony communication between said origin node and said destination node.

23. The method according to claim 17, wherein said unique communication link is a voice link.

24. The method according to claim 17, further comprising the step of establishing telephony connection between said origin node and said destination node, over said unique communication link.

25. The method according to claim 24, further comprising the step of monitoring said telephony connection, using said established signaling communication between said call management node and said destination node and said established signaling communication between said call management node and said origin node.

26. The method according to claim 24, further comprising the step of managing said telephony connection, using said established signaling communication between said call management node and said destination node and said established signaling communication between said call management node and said origin node.

27. The method according to claim 18, further comprising the step of establishing telephony connection between said origin node and said destination node, over said unique communication link.

28. The method according to claim 27, further comprising the step of monitoring said telephony connection, using said established signaling communication between said call management node and said destination node and said established signaling communication between said call management node and said origin node.

29. The method according to claim 27, further comprising the step of managing said telephony connection, using said established signaling communication between said call management node and said destination node and said established signaling communication between said call management node and said origin node.

30. The method according to claim 17, further comprising the step of establishing a voice connection between said call management node and a terminal coupled to said origin node.

31. The method according to claim 17, further comprising the step of establishing a voice connection between said call management node and a terminal coupled to said destination node.

32. The method according to claim 17, wherein said origin node communication link parameters are identical to said destination node communication link parameters.

33. The method according to claim 17, wherein said origin node communication link parameters are different than said destination node communication link parameters.

34. The method according to claim 17, wherein said step of establishing comprises the procedure of:
producing a signaling message including at least an originating node point code parameter and a destination node point code parameter.

35. The method according to claim 34, wherein said originating node point code parameter is equal to the point code of said origin node.

36. The method according to claim 34, wherein said originating node point code parameter is equal to the point code of said call management node.

37. The method according to claim 34, wherein said step of establishing comprises the procedure of directing said signaling message to said destination node according to said destination node point code parameter.

38. The method according to claim 17, further comprising the step of receiving a request to perform a telephony operation between said origin node and said destination node.

39. The method according to claim 38, wherein said telephony operation is selected from the list consisting of:
establishing a telephony connection;
terminating a telephony connection; and
rerouting a telephony connection.

40. The method according to claim 38, further comprising the step of performing said telephony operation according to said signaling message.

41. The method according to claim 17, wherein said origin node identification equals said destination node identification.

42. Method for managing a telephony network comprising the steps of:
extracting destination node identification and destination node communication link parameters of a destination node, from at least one field in a signaling message received from an origin node; said signaling message defining a call management node as a logical destination node for a physical communication link between said origin node and said destination node; and
establishing signaling communication between said call management node and said destination node using said destination node communication link parameters,
wherein said origin node determines origin node communication link parameters, and
wherein said origin node communication link parameters and said destination node communication link parameters are uniquely associated with said physical communication link.

43. The method according to claim 42, further comprising the step of establishing signaling communication between said call management node and said origin node using said origin node communication link parameters.

44. The method according to claim 42, further comprising the preliminary step of receiving said origin node identification and said origin node communication link parameters.

45. The method according to claim 42, further comprising the preliminary step of receiving said origin node identification and said origin node communication link parameters from said origin node.

46. The method according to claim 42, further comprising the preliminary step of determining said origin node identification and said origin node communication link parameters.

47. The method according to claim 46, further comprising the preliminary step of receiving a request to establish telephony communication between said origin node and said destination node.

48. The method according to claim 42, wherein said unique communication link is a voice link.

49. The method according to claim 42, further comprising the step of establishing telephony connection between said origin! node and said destination node, over said unique communication link.

50. The method according to claim 49, further comprising the step of monitoring said telephony connection, using said established signaling communication between said call management node and said destination node and said established signaling communication between said call management node and said origin node.

51. The method according to claim 49, further comprising the step of managing said telephony connection, using said established signaling communication between said call management node and said destination node and said established signaling communication between said call management node and said origin node.

52. The method according to claim 43, further comprising the step of establishing telephony connection between said origin node and said destination node, over said unique communication link.

53. The method according to claim 52, further comprising the step of monitoring said telephony connection, using said established signaling communication between said call management node and said destination node and said established signaling communication between said call management node and said origin node.

54. The method according to claim 52, further comprising the step of managing said telephony connection, using said established signaling communication between said call management node and said destination node and said established signaling communication between said call management node and said origin node.

55. The method according to claim 42, further comprising the step of establishing a voice connection between said call management node and a terminal coupled to said origin node.

56. The method according to claim 42, further comprising the step of establishing a voice connection between said call management node and a terminal coupled to said destination node.

57. The method according to claim 42, wherein said origin node communication link parameters are identical to said destination node communication link parameters.

58. The method according to claim 42, wherein said origin node communication link parameters are different than said destination node communication link parameters.

59. The method according to claim 42, wherein said step of establishing comprises the procedures of:
    producing a signaling message including at least an originating node point code parameter and a destination node point code parameter; and
    directing said signaling message to said destination node according to said destination node point code parameter.

60. The method according to claim 59, wherein said originating node point code parameter is equal to the point code of said origin node.

61. The method according to claim 59, wherein said originating node point code parameter is equal to the point code of said call management node.

62. The method according to claim 59, further comprising the step of directing said signaling message to said destination node.

63. The method according to claim 42, further comprising the step of receiving a request to perform a telephony operation between said origin node and said destination node.

64. The method according to claim 63, wherein said telephony operation is selected from the list consisting of:
    establishing a telephony connection;
    terminating a telephony connection; and
    rerouting a telephony connection.

65. The method according to claim 63, further comprising the step of performing said telephony operation according to said signaling message.

66. The method according to claim 63, wherein said request is received in the form of a signaling message.

67. The method according to claim 66, wherein said destination node identification is embedded in a dialed digits field of said signaling message.

68. The method according to claim 66, wherein said destination node identification is embedded in a selected field of said signaling message.

69. The method according to claim 42, wherein said origin node identification equals to said destination node identification.

70. In a network including at least a first network node and a second network node, connected there between via a physical communication link, a call management system comprising:
    a processor;
    a storage unit, coupled to said processor, containing a translation table associating physical network resources of a first network node and physical network resources of a second network node;
    a signaling interface, coupled to said processor,
    wherein said signaling interface establishes signaling communication to said first network node and to said second network node, said signaling communication designating said network management node as the originating node for said physical communication link.

71. The call management system according to claim 30, further comprising a voice interface, coupled to said processor, for coupling to a network-switching node.

72. The call management system according to claim 30, further comprising a general communication interface, coupled to said processor, for coupling to a network module.

73. The call management system according to claim 72, wherein said network module is selected from the list consisting of:
    a database;
    a supervision node;
    a local area network; and
    a wide area network.

74. The call management system according to claim 70, wherein said call management system directs a signaling message to at least one of said first network node and said second network node.

75. The call management system according to claim 70, wherein the point code of said first network node equals the point code of said second network node.

76. The call management system according to claim 70, wherein said call management system receives destination node identification of said second network node.

77. The call management system according to claim 76, wherein said destination node identification is embedded in a dialed digits field of a signaling message.

78. The call management system according to claim 76, wherein said destination node identification is embedded in a selected field of a signaling message.

79. The call management system according to claim 70, wherein said call management system produces at least one signaling message thereby terminating a call session over said multi-channel connection.

* * * * *